US011281031B1

(12) United States Patent
Sears et al.

(10) Patent No.: US 11,281,031 B1
(45) Date of Patent: Mar. 22, 2022

(54) POLARIZATION-AGNOSTIC OPTICAL DIMMING DEVICE AND OPTICAL ASSEMBLY INCLUDING THE SAME

(71) Applicant: Facebook Technologies, LLC, Menlo Park, CA (US)

(72) Inventors: Jasmine Soria Sears, Menlo Park, CA (US); Afsoon Jamali, Menlo Park, CA (US); Gareth Valentine, Menlo Park, CA (US); Nathan Matsuda, Menlo Park, CA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 215 days.

(21) Appl. No.: 16/792,173

(22) Filed: Feb. 14, 2020

(51) Int. Cl.
| | |
|---|---|
| *G02F 1/03* | (2006.01) |
| *G02F 1/35* | (2006.01) |
| *G02F 1/1335* | (2006.01) |
| G02F 1/13363 | (2006.01) |
| G02F 1/1343 | (2006.01) |

(52) U.S. Cl.
CPC ...... *G02F 1/0311* (2013.01); *G02F 1/133528* (2013.01); *G02F 1/3515* (2013.01); *G02F 1/133638* (2021.01); *G02F 1/134381* (2021.01)

(58) Field of Classification Search
CPC ............ G02F 1/0311; G02F 1/133528; G02F 1/3515; G02F 1/134381; G02F 1/133638
USPC ........................................................... 349/96
See application file for complete search history.

(56) References Cited

U.S. PATENT DOCUMENTS 6,141,071 A * 10/2000 Sharp ................... G02F 1/141
349/121

* cited by examiner

*Primary Examiner* — Nathanael R Briggs
*Assistant Examiner* — William D Peterson
(74) *Attorney, Agent, or Firm* — Millburn IP PLLC

(57) ABSTRACT

An optical dimming device includes at least one polarization rotator configured to switch a polarization of a linearly polarized component of an incoming light between two orthogonal polarizations. The optical dimming device also includes at least one polarizer coupled with the at least one polarization rotator, and configured to output a light having a light intensity reduced to a predetermined percentage of an initial light intensity of the incoming light. The predetermined percentage is substantially the same for different incoming lights having different initial polarizations.

20 Claims, 24 Drawing Sheets

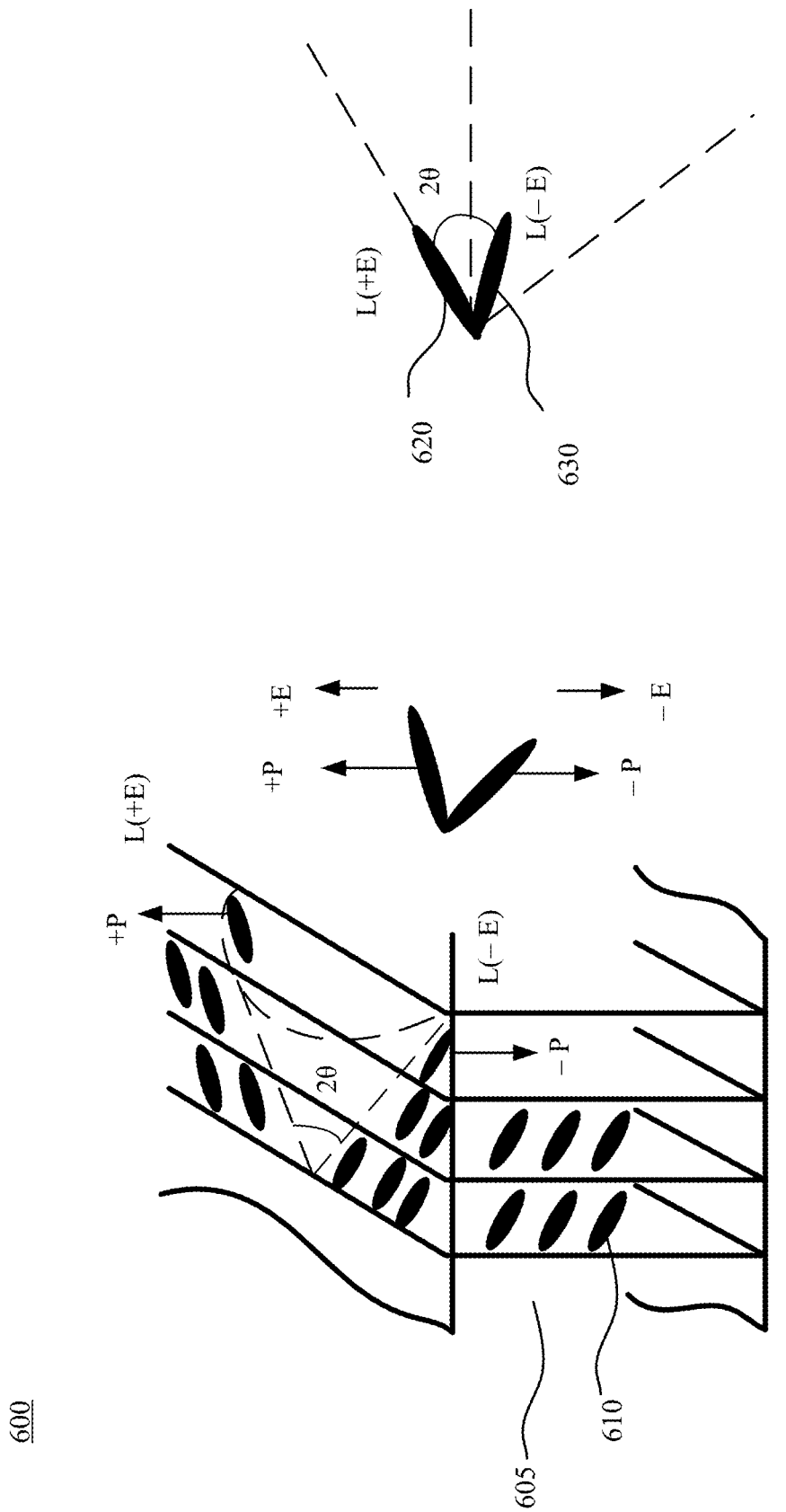

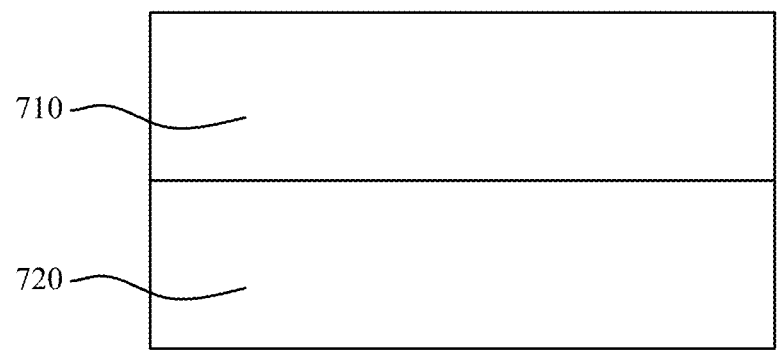
700
710
720
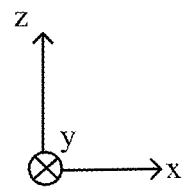
FIG. 7

POLARIZATION-AGNOSTIC OPTICAL DIMMING DEVICE AND OPTICAL ASSEMBLY INCLUDING THE SAME

TECHNICAL FIELD

The present disclosure relates generally to optical devices and, more specifically, to a polarization-agnostic optical dimming device and an optical assembly including the same.

BACKGROUND

Near-eye displays ("NEDs") have been widely used in a wide variety of applications, such as aviation, engineering, scientific research, medical devices, computer games, videos, sports, training, and simulations. NEDs function as a virtual reality ("VR") device, an augmented reality ("AR") device, and/or a mixed reality ("MR") device. When functioning as AR and/or MR devices, NEDs are at least partially transparent from the perspective of a user, enabling the user to view a surrounding real world environment. Such NEDs are also referred to as optically see-through NEDs. When functioning as VR devices, NEDs are opaque such that the user is substantially immersed in the VR imagery provided via the NEDs. An NED may be switchable between functioning as an optically see-through device and functioning as a VR device.

SUMMARY

Consistent with a disclosed embodiment of the present disclosure, an optical dimming device is provided. The optical dimming device includes at least one polarization rotator configured to switch a polarization of a linearly polarized component of an incoming light between two orthogonal polarizations. The optical dimming device also includes at least one polarizer coupled with the at least one polarization rotator, and configured to output a light having a light intensity reduced to a predetermined percentage of an initial light intensity of the incoming light. The predetermined percentage is substantially the same for different incoming lights having different initial polarizations.

Consistent with a disclosed embodiment of the present disclosure, an optical assembly is provided. The optical assembly includes an optical combiner including a first side facing a real world environment and an opposing second side facing an eye-box of the optical assembly. The optical assembly also includes an optical dimming device disposed at the first side of the optical combiner and including at least one polarization rotator configured to switch a polarization of a linearly polarized component of a first light from a real world environment between two orthogonal polarizations. The optical dimming device also includes at least one polarizer coupled with the at least one polarization rotator, and configured to output a second light having a light intensity reduced to the predetermined percentage of an initial light intensity of the first light. The predetermined percentage is substantially the same for different first lights having different initial polarizations. The optical combiner is configured to combine a third light from a light source and the second light to the eye-box.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings:

FIG. 6A illustrates a schematic diagram of a polarization rotator including ferroelectric liquid crystals ("FLCs"), according to an embodiment of the present disclosure;

FIG. 6B illustrates two final states of ferroelectric liquid crystal ("FLC") molecules in the polarization rotator of FIG. 6A, according to an embodiment of the present disclosure;

FIG. 7 illustrates a schematic diagram of a polarization rotator, according to another embodiment of the present disclosure;

DETAILED DESCRIPTION

Figure 1A:
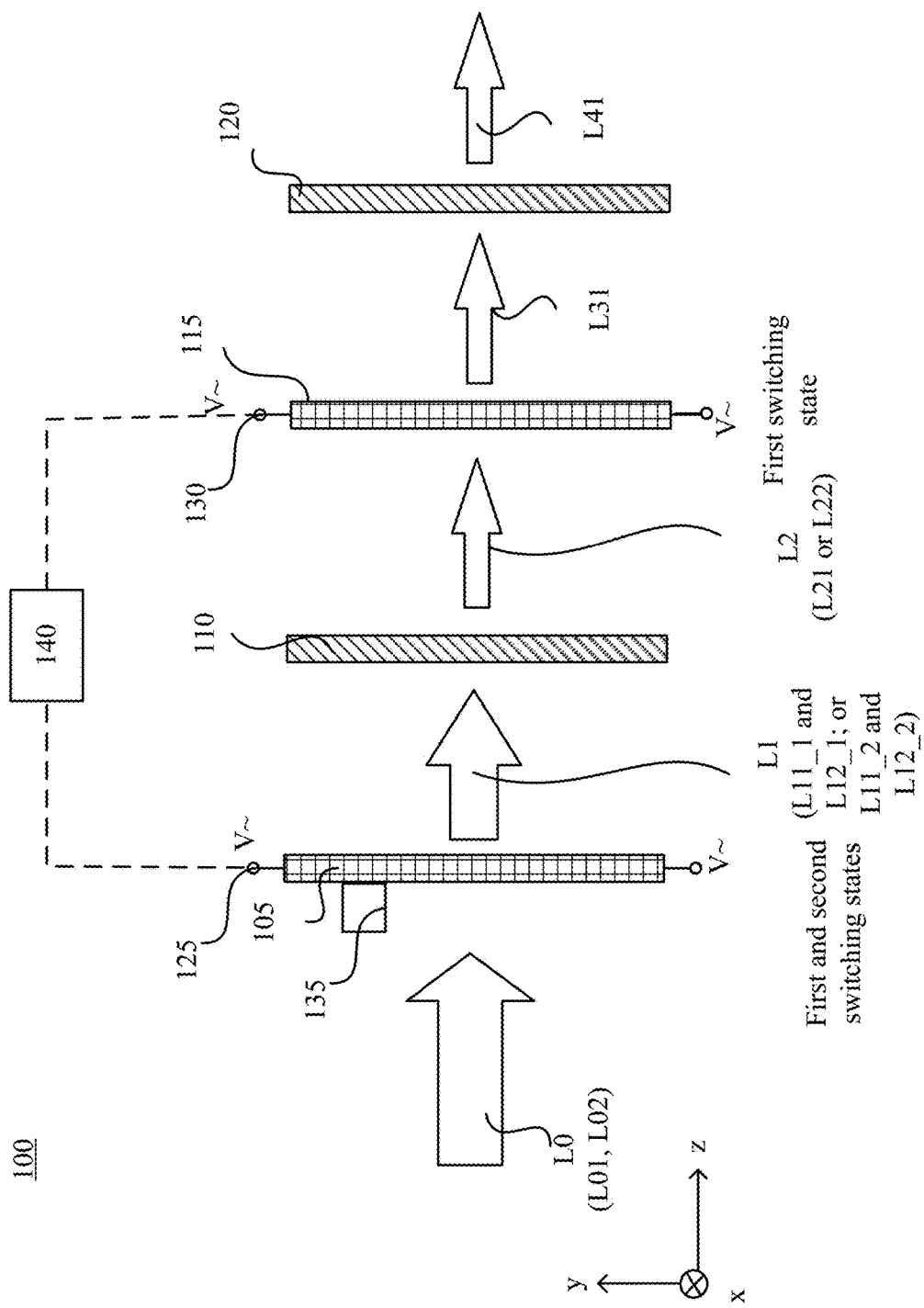
FIG. 1A illustrates a schematic diagram of an optical dimming device at a clear state, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The wavelength ranges or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

The term "communicatively coupled" or "communicatively connected" indicates that related items are coupled or connected through a communication channel, such as a wired or wireless communication channel.

In the accompanying drawings, legends such as "x," "y," and "z" shown in a coordinate system are used to denote the directions of light propagation, a transmission axis direction of a polarizer, or a polarization direction of a linearly polarized light. Symbol "x" inside a small circle denotes a polarization direction going into the paper. Symbol "•" inside a small circle denotes a polarization direction coming out of the paper. In this detailed description and in the drawings, certain legends are used to denote the light outputs in stages. For example, "L1" and "L2" denote light outputs from a first polarization rotator and a first linear polarizer.

The term "constantly" or "continuously" as used in phrases such as "constantly switching" or "continuously switching" means that a switching action is performed at a predetermined frequency or rate (e.g., at 60 Hz or above) between two or more polarizations by a polarization rotator when an optical dimming device is at an operating state, such as a clear state or an intermediate state.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

Users of NEDs may look at different types of electronic screens, e.g., a cell phone screen, a TV screen, a laptop screen, present in an ambient environment without taking off the NEDs. These ambient electronic screens emit image lights of various polarizations that may not be controlled by the users. An NED may include a dimmer that controls an amount of an ambient light (e.g., image lights emitted from the electronic screens, lights from real world objects, etc.) that passes through the NED to the user. The dimmer may dynamically adjust the transmittance of the ambient light received by the eyes of the user. The dimmer may substantially block the ambient light, such that the NED may be switchable between functioning as an optically see-through device and functioning as a VR device.

A conventional optical dimmer (or optical dimming device) that includes two polarizers and a liquid crystal ("LC") cell sandwiched therebetween may be controlled by applying an external field, e.g., an electric field, to the LC cell. The conventional optical dimmer may render a satisfactory dimming effect for some type of ambient electronic screens and may not render a satisfactory dimming effect for some other types of ambient electronic screens, as the conventional optical dimmer may be biased in the dimming effectiveness when receiving lights of different polarizations. That is, a conventional optical dimmer may be polarization dependent rather than polarization agnostic (e.g., polarization independent). For example, a conventional optical dimmer may include two crossed linear polarizers (e.g., a polarizer and an analyzer) and a twisted-nematic LC ("TNLC") cell sandwiched therebetween. The conventional optical dimmer may be designed to dim or substantially block an ambient light at a dark state (e.g., when the TNLC cell is at a voltage-on state where an applied voltage is sufficient high to re-orient the liquid crystal molecules along an electric field direction). The conventional optical dimmer may primarily or substantially transmit the ambient light at a clear state (e.g., when the TNLC cell is at a voltage-off state or more generally when an applied voltage is below a minimum voltage threshold). When the polarization of an ambient light is orthogonal to the transmission axis of the polarizer, the ambient light may be substantially blocked by the polarizer even when the conventional optical dimmer is at the clear state (e.g., when the TNLC cell is at a voltage-off state or more generally when an applied voltage is below a minimum voltage threshold). That is, when such an ambient light is an image light emitted from an ambient electronic screen, the ambient electronic screen may appear visually dark to the user of the NED. In other words, the user of the NED may not observe or perceive images displayed on the ambient electronic screen. To perceive the images displayed on the ambient electronic screen, the user may need to remove the NED or adjust the orientation of the polarizer, which may increase the operation complexity of the NED and degrade the user experience.

In view of the disadvantages of the conventional optical dimmer, the present disclosure provides a polarization-agnostic optical dimming device (e.g., a polarization-agnostic optical dimming shield) configured to dim an incoming light to a predetermined percentage of an initial light intensity of the incoming light. The predetermined percentage may be substantially the same for different incoming lights having different initial polarizations. The initial light intensity and initial polarization of the incoming light are the light intensity and polarization of the incoming light, respectively, when the incoming light is incident onto the polarization-agnostic optical dimming device. The polarization-agnostic optical dimming device may include at least one polarization rotator configured to switch a polarization of a linearly polarized component of the incoming light between a first polarization and a second polarization at a predetermined high switching frequency (or rate, speed), such as at least about 60 Hz. In some embodiments, the predetermined high switching frequency may be greater than or equal to about 120 Hz. In some embodiments, the first polarization and the second polarization may be two orthogonal polarizations. In some embodiments, the polarization-agnostic optical dimming device may include at least one polarizer coupled with the at least one polarization rotator, and configured to receive an optical output from the at least one polarization rotator. The at least one polarizer may be configured to output a light having a light intensity reduced to a predetermined percentage of an initial light intensity of the incoming light. The predetermined percentage may be substantially the same for different incoming lights having different initial polarizations. For example, the predetermined percentage may be about 50%, 45%, 40%, 35%, 30%, 25%, 20%, or any suitable percentage between 20% and 50%, regardless (e.g., independent) of the initial polarizations of the incoming lights. In some embodiments, the entire incoming light may be substantially linearly polarized. In some embodiments, the incoming light may be decomposed into two substantially equal linearly polarized components of orthogonal polarizations. The at least one polarization rotator may be configured to switch a polarization of each of the two linearly polarized components between the first polarization and the second polarization (which may be orthogonal to one another) at a predetermined high switching frequency.

The polarization-agnostic optical dimming device may be implemented in an optically see-through NED, through which a user of the NED may perceive an incoming light from a real world environment that is dimmed by the polarization-agnostic optical dimming device to a predetermined percentage of an initial light intensity of the incoming light. The predetermined percentage may be substantially the same for different incoming lights having different initial polarizations from the real world environment.

Figure 1B:
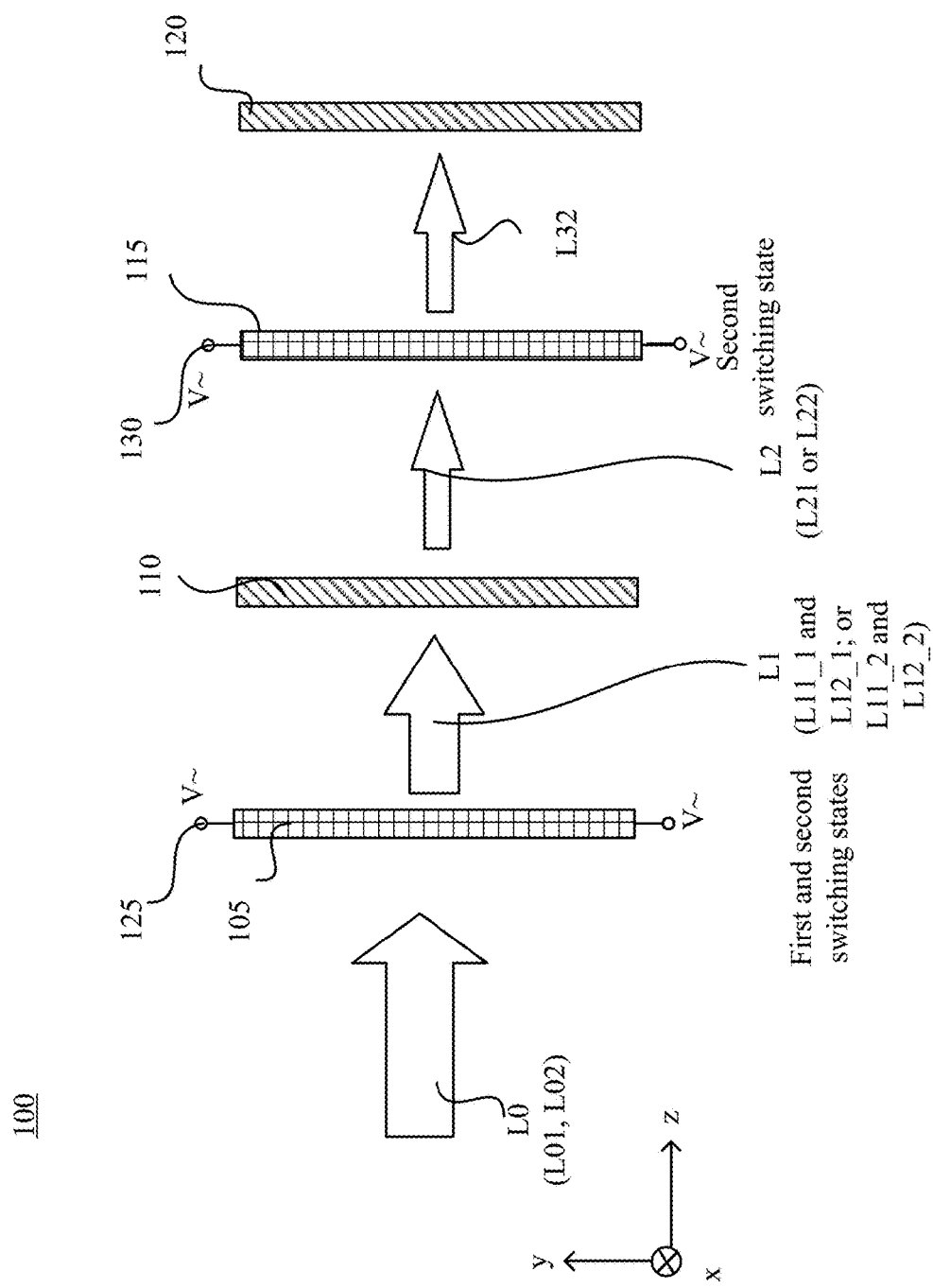
FIG. 1B illustrates a schematic diagram of the optical dimming device at a dark state, according to an embodiment of the present disclosure.
Figure 1C:
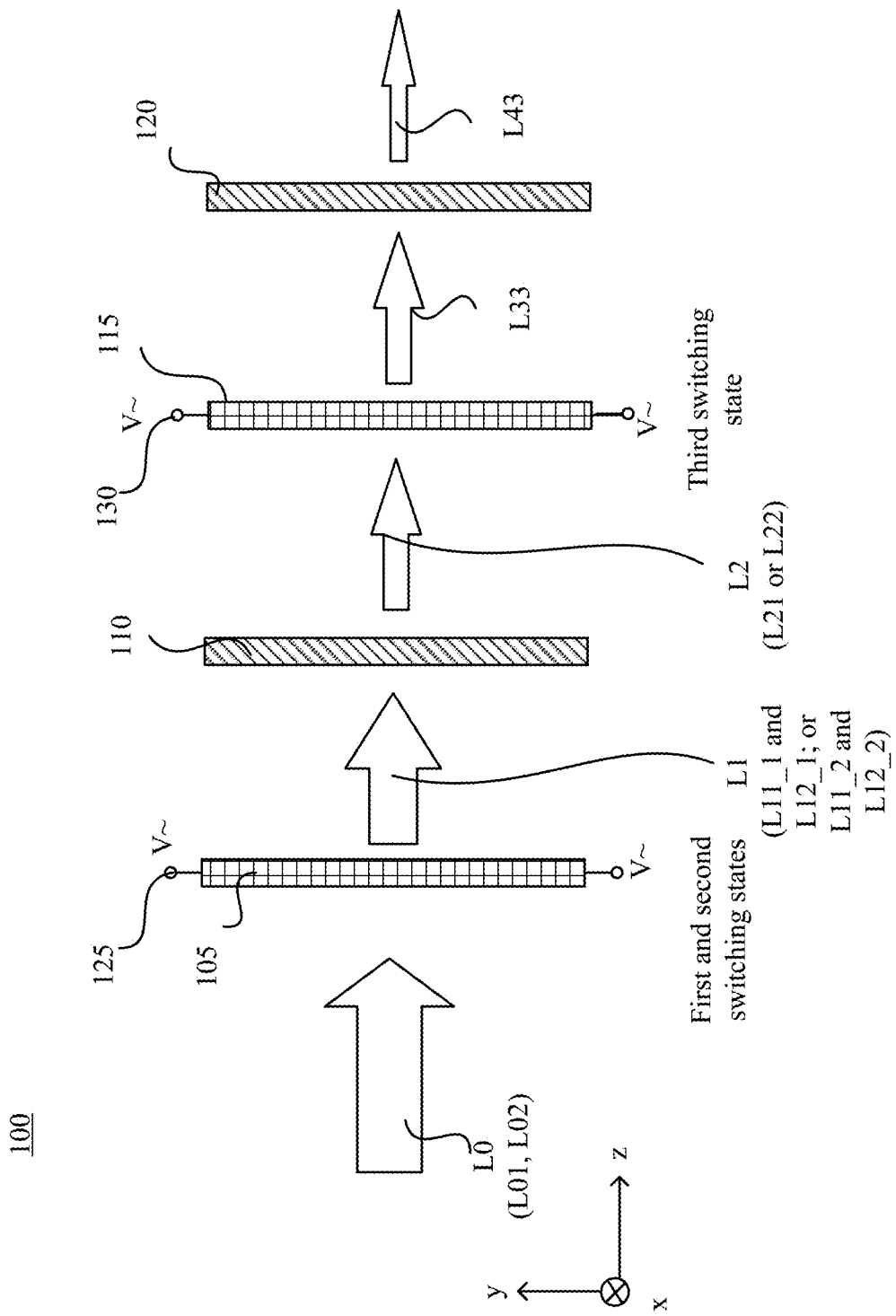
FIG. 1C illustrates a schematic diagram of the optical dimming device at an intermediate state, according to an embodiment of the present disclosure.

FIGS. 1A-1C illustrate schematic diagrams of a polarization-agnostic optical dimming device or dimmer (e.g., an optical dimming shield) 100 at three respective operating states: e.g., a clear state, a dark state, and an intermediate state, according to an embodiment of the present disclosure. As shown in FIG. 1A, the polarization-agnostic optical dimming device 100 may include a first polarization rotator or rotating element 105, a first polarizer 110, a second polarization rotator or rotating element 115, and a second polarizer 120 arranged in optical series and optically coupled with one another. In some embodiments, the polarization-agnostic optical dimming device 100 may include additional optical elements. In some embodiments, one or more elements shown in FIG. 1A may be omitted from the polarization-agnostic optical dimming device 100. For example, in some embodiments, the second polarization rotator 115 and the second polarizer 120 may be omitted.

The polarization-agnostic optical dimming device 100 may be configured for dimming a light in at least the visible spectrum. For example, the first polarization rotator 105, the first polarizer 110, the second polarization rotator 115, and the second polarizer 120 may be configured for processing a light in at least the visible spectrum. For simplicity of description in the present discourse, the first polarization rotator 105 and the second polarization rotator 115 may be polarization rotators that do not absorb or reflect an incoming light or that absorb and/or reflect a negligible amount of the incoming light. In other words, a light may be substantially transmitted through the first polarization rotator 105 and the second polarization rotator 115. The first polarizer 110 and the second polarizer 120 may be optical polarizers that absorb a light having a predetermined polarization state and do not absorb or reflect a light having a different polarization state.

As shown in FIG. 1A, an incoming light L0 incident onto the first polarization rotator 105 may be an unpolarized incoming light, a circularly polarized incoming light, or a linearly polarized incoming light. Each of the unpolarized incoming light, the circularly polarized incoming light, and the linearly polarized incoming light may be decomposed into two substantially equal linearly polarized light components L01 and L02 with orthogonal polarizations (e.g., horizontal and vertical polarizations). The intensity of each light component L01 and L02 may be about half (50%) of the light intensity $I_{L0}$ of the incoming light L0.

During an operation of the polarization-agnostic optical dimming device 100, the first polarization rotator 105 may be an active polarization rotator with a polarization axis (e.g., a fast axis) orientated in a predetermined direction. The first polarization rotator 105 may be configured to constantly (e.g., continuously) switch a polarization of each of the linearly polarized light components L01 and L02 between two orthogonal polarizations, e.g., a first polarization and a second polarization. A linearly polarized light having the first polarization may have a polarization direction in a first direction. A linearly polarized light having the second polarization may have a polarization direction in a second direction that may be orthogonal to the first direction. In some embodiments, the first polarization rotator 105 may be configured to constantly switch a polarization of a linearly polarized light component between two orthogonal polarizations, e.g., the first polarization and the second polarization, at a predetermined high switching frequency. In some embodiments, the predetermined high switching frequency for switching the polarization may be at least 60 Hz. In some embodiments, the predetermined high switching frequency for switching the polarization may be greater than or equal to 120 Hz.

In some embodiments, the first polarization rotator 105 may include a twisted-nematic liquid crystal ("TNLC") cell. In some embodiments, the first polarization rotator 105 may include a switchable half-waveplate ("SHWP"). In some embodiments, the SHWP may be a liquid crystal ("LC") based SHWP. In some embodiments, the first polarization rotator 105 may include two or more LC cells stacked in series. In some embodiments, the two or more LC cells may be filled with the same material and arranged with orthogonal alignment directions. For example, the two or more LC cells may be positioned or oriented relative to one another such that the corresponding alignment directions of the LC cells are orthogonal to each other. Exemplary polarization rotators will be described in connection with FIGS. 5A-7.

Referring to FIG. 1A, the first polarization rotator 105 may be operated at a first switching state or a second switching state. In some embodiments, at the first switching state, the first polarization rotator 105 may be configured to convert the linearly polarized light component L01 having the horizontal polarization into a linearly polarized light L11_1 having the first polarization. The first polarization of the linearly polarized light L11_1 may be substantially similar to that (e.g., horizontal polarization) of the linearly polarized light component L01, or may be rotated by up to 180° relative to that of the linearly polarized light component L01. The first polarization rotator 105 may also be configured to convert the linearly polarized light component L02 having the vertical polarization to a linearly polarized light L12_1 having the second polarization. The second polarization may be substantially similar to that (e.g., vertical polarization) of the linearly polarized light component L02, or may be rotated by up to 180° relative to that of the linearly polarized light component L02. The first polarization may be orthogonal to the second polarization.

The first polarizer 110 may be optically coupled with the first polarization rotator 105. For example, the first polarizer 110 may be configured to receive an optical output from the first polarization rotator 105. The first polarizer 110 may be an absorption type linear polarizer with a transmission axis oriented in a third direction. Accordingly, the first polarizer 110 may be configured to transmit a linearly polarized light polarized in the third direction (referred to as a linearly polarized light having a third polarization), and block a linearly polarized light having a polarization orthogonal to the third polarization. The third direction may have an angle α with respective to the first direction, where 0≤α≤90°. The third direction may have an angle (90°−α) with respective to the second direction. In some embodiments, the third direction may be parallel to one of the first direction or the second direction, and orthogonal to the other one of the first direction or the second direction. In some embodiments, the third direction may not be parallel to the first direction or the second direction.

The first polarizer 110 may transmit the linearly polarized light L11_1 having the first polarization as a linearly polarized light L21_1 having the third polarization, and transmit the linearly polarized light L12_1 having the second polarization as a linearly polarized light L21_2 having the third polarization. The transmission axis (e.g., third direction) of the first polarizer 110 may have the angle α (0≤α≤90°) with respect to the first direction. Accordingly, the light intensity of the linearly polarized light L21_1 may be determined as $0.5*I_{L0}*\sin^2(\alpha)$, and the light intensity of the linearly polarized light L21_2 may be determined as $0.5*I_{L0}*\cos^2(\alpha)$. An overall output light of the first polarizer 110 may be a linearly polarized light L21 that is formed by the linearly polarized light L21_1 and the linearly polarized light L21_2. A light intensity $I_{L21}$ of the linearly polarized light L21 may be a sum of the light intensities of the linearly polarized light L21_1 and the linearly polarized light L21_2, where $I_{L21}=0.5*I_{L0}*\sin^2(\alpha)+0.5*I_{L0}*\cos^2(\alpha)=0.5*I_{L0}$. That is, when the first polarization rotator 105 is at the first switching state, an overall optical output of the first polarizer 110 may be a linearly polarized light L21 having the third polarization and the light intensity of $0.5*I_{L0}$. In other words, when the first polarization rotator 105 is at the first switching state, the light intensity of the light L21 output from the first polarizer 110 may be reduced to about 50% of the initial light intensity of the incoming light L0.

At the second switching state, as shown in FIG. 1A, the first polarization rotator 105 may be configured to convert the linearly polarized light component L01 having the horizontal polarization into a linearly polarized light L11_2 having the second polarization, which may be orthogonal to the polarization (e.g., first polarization) of the linearly polarized light L11_1 output by the first polarization rotator 105 at the first switching state. The first polarization rotator 105 may convert the linearly polarized light component L02 having the vertical polarization into a linearly polarized light L12_2 having the first polarization, which may be orthogonal to the polarization (e.g., second polarization) of the linearly polarized light L12_1 output by the first polarization rotator 105 at the first switching state. The first polarizer 110 may transmit the linearly polarized light L11_2 having the second polarization as a linearly polarized light L22_1 having the third polarization. The first polarizer 110 may transmit the linearly polarized light L12_2 having the first polarization as a linearly polarized light L22_2 having the third polarization. The transmission axis (e.g., third direction) of the first polarizer 110 may have an angle α(0≤α≤90°) with respect to the first direction. Accordingly, the light intensity of the linearly polarized light L22_1 may be determined as $0.5*I_{L0}*\cos^2(\alpha)$, and the light intensity of the linearly polarized light L22_2 may be determined as $0.5*I_{L0}*\sin^2(\alpha)$.

An overall output light of the first polarizer 110 may be a linearly polarized light L22 formed by the linearly polarized light L22_1 and the linearly polarized light L22_2. A light intensity $I_{L22}$ of the linearly polarized light L22 may be a sum of the light intensities of the linearly polarized light L22_1 and the linearly polarized light L22_2, where $I_{L22}=0.5*I_{L0}*\cos^2(\alpha)+0.5*I_{L0}*\sin^2(\alpha)=0.5*I_{L0}$. That is, when the first polarization rotator 105 is at the second switching state, an overall optical output of the first polarizer 110 may be a linearly polarized light L22 having the third polarization and the light intensity of $0.5*I_{L0}$. In other words, when the first polarization rotator 105 is at the second switching state, the light intensity of the light L22 output from the first polarizer 110 may be reduced to about 50% of the initial light intensity of the incoming light L0.

In some embodiments, at both the first and second switching states of the first polarization rotator 105, an optical output of the first polarizer 110 may be a linearly polarized light L2 (e.g., L21 at the first switching state or L22 at the second switching state) having a light intensity of $0.5*I_{L0}$. That is, when the incoming light L0 is an unpolarized incoming light, a circularly polarized incoming light, or a linearly polarized incoming light, which may be decomposed into two substantially equal linearly polarized light components with orthogonal polarization directions, the light intensity of the linearly polarized light L2 output from the first polarizer 110 may be reduced to about 50% of the initial light intensity of the incoming light L0. In other words, the combination of the first polarization rotator 105 and the first polarizer 110 may reduce the light intensity of the incoming light L0 to a substantially same predetermined level (e.g., about 50%) of the initial light intensity of the incoming light L0, regardless (e.g., independent) of the initial polarization of the incoming light L0.

In some embodiments, the second polarization rotator 115 may be optically coupled with the first polarizer 110. For example, the second polarization rotator 115 may be configured to receive the linearly polarized light L2 having the third polarization from the first polarizer 110. The second polarization rotator 115 may be an active polarization rotator with a polarization axis (e.g., a fast axis) oriented relative to the third direction. The second polarization rotator 115 may be configured to switch the linearly polarized light L2 between two orthogonal polarizations, e.g., a fourth polarization and a fifth polarization. A linearly polarized light having the fourth polarization may have a polarization direction in a fourth direction. A linearly polarized light having the fifth polarization may have a polarization direction in a fifth direction different from the fourth direction. The fourth direction may have an angle β with respect to the third direction, where 0≤β≤180°. The second polarizer 120 may be configured to receive a linearly polarized light having the fourth polarization or the fifth polarization from the second polarization rotator 115, depending on the switching state of the second polarization rotator 115. The second polarizer 120 may be an absorption type linear polarizer with a transmission axis orientated in the fourth direction or the fifth direction, depending a desirable default state (e.g., default clear state or default dark state) of the polarization-agnostic optical dimming device 100.

In some embodiments, the second polarization rotator 115 may be operated at a first switching state and a second switching state. In some embodiments, at the first switching state, as shown in FIG. 1A, the second polarization rotator 115 may be configured to convert the linearly polarized light L2 having the third polarization into a linearly polarized light L31 having the fourth polarization and direct the linearly polarized light L31 toward the second polarizer 120. The light intensity of the linearly polarized light L31 may remain at $0.5*I_{L0}$. The second polarizer 120 may be optically coupled with the second polarization rotator 115. The second polarizer 120 may receive the light output from the second polarization rotator 115. In some embodiments, the transmission axis of the second polarizer 120 may be parallel to the fourth direction. The linearly polarized light L31 having the fourth polarization may be transmitted through the second polarizer 120 as a linearly polarized light L41 having the fourth polarization, resulting in a clear state for the polarization-agnostic optical dimming device 100. The light intensity of the linearly polarized light L41 may be $0.5*I_{L0}$.

At the second switching state, as shown in FIG. 1B, the second polarization rotator 115 may be configured to convert the linearly polarized light L2 having the third polarization into a linearly polarized light L32 having the fifth polarization, and direct the linearly polarized light L32 toward the second polarizer 120. The light intensity of the linearly polarized light L32 output by the second polarization rotator 115 may remain at $0.5*I_{L0}$. The second polarizer 120 may be optically coupled with the second polarization rotator 115. The second polarizer 120 may receive the light output from the second polarization rotator 115. The second polarizer 120 having the transmission axis parallel to the fourth direction may block the linearly polarized light L32 having the fifth polarization, resulting in a dark state for the polarization-agnostic optical dimming device 100.

In some embodiments, as shown in FIG. 1C, the second polarization rotator 115 may also be operated at a third switching state. At the third switching state, the second polarization rotator 115 may be configured to rotate the polarization direction of the linearly polarized light L2 having the third polarization to a sixth polarization other than the fourth polarization or the fifth polarization (e.g., a sixth polarization different from the fourth polarization and the fifth polarization). The second polarization rotator 115 may output a linearly polarized light L33 having the sixth polarization toward the second polarizer 120. The light intensity of the linearly polarized light L33 may remain at $0.5*I_{L0}$. A linearly polarized light having the sixth polarization may have a polarization direction in a sixth direction, which may have an angle γ with respect to the fourth direction, where 0<γ<90°. In some embodiments, the second polarizer 120 may at least partially transmit the linearly polarized light L33 as a linearly polarized light L43 having the fourth polarization and a light intensity of $0.5*I_{L0}*\cos^2(\gamma)$, resulting in an intermediate state for the polarization-agnostic optical dimming device 100. When the polarization-agnostic optical dimming device 100 is at the intermediate state, a light intensity of a transmitted light may be between a maximum transmitted light intensity (e.g., $0.5*I_{L0}$) at the clear state and a minimum transmitted light intensity (e.g., 0) at the dark state. The light intensity of the linearly polarized light L43 may be controlled by controlling the angle γ. In some embodiments, controlling the angle γ may be realized by controlling, e.g., an external electric field applied to the second polarization rotator 115.

Referring back to FIG. 1A, in some embodiments, the first polarization rotator 105 may be powered by a first power source 125. The second polarization rotator 115 may be powered by a second power source 130. The dimming effect of the polarization-agnostic optical dimming device 100 may be controlled by a dimming controller 140. The dimming controller 140 may be configured to receive an input from a user or a device indicating a mode of operation, such as functioning as a "dimmer," functioning as a "shutter," etc. Other inputs to the dimming controller 140 may include an input (or signal) received from a light sensor 135 that indicates the brightness of an incoming ambient light and/or an input (or signal) received from a light source. For example, when receiving an input indicating selection of a mode for "shutter," based on the input, the dimming controller 140 may adjust the second power source 130 to set the second polarization rotator 115 at the second switching state. In some embodiments, the first power source 125 applied to the first polarization rotator 105 may be adjusted to switch off the first polarization rotator 105, thereby saving power consumption. In some embodiments, when receiving an input indicating selection of a mode for "dimmer," based on the input, the dimming controller 140 may adjust the second power source 130 to set the second polarization rotator 115 at the first switching state. The first power source 125 applied to the first polarization rotator 105 may be adjusted to constantly switch the first polarization rotator 105 between the first switching state and the second switching state a predetermined high switching frequency. The polarization-agnostic optical dimming device 100 may function as a dimmer, through which incoming lights from the real world environment may be dimmed to a substantially same predetermined percentage of an initial intensity of the respective incoming lights regardless (e.g., independent) of the initial polarizations of the incoming lights. In some embodiments, the dimming controller 140 may be configured to adjust the second power source 130 applied to the second polarization rotator 115 to set the second polarization rotator 115 at the third switching state, thereby mitigating the difference in brightness of the real world and virtual scenes. For simplicity, the dimming controller 140 and sensor 135 included in the embodiments shown in FIGS. 1B and 1C are not shown in FIGS. 1B and 1C.

Figure 2A:
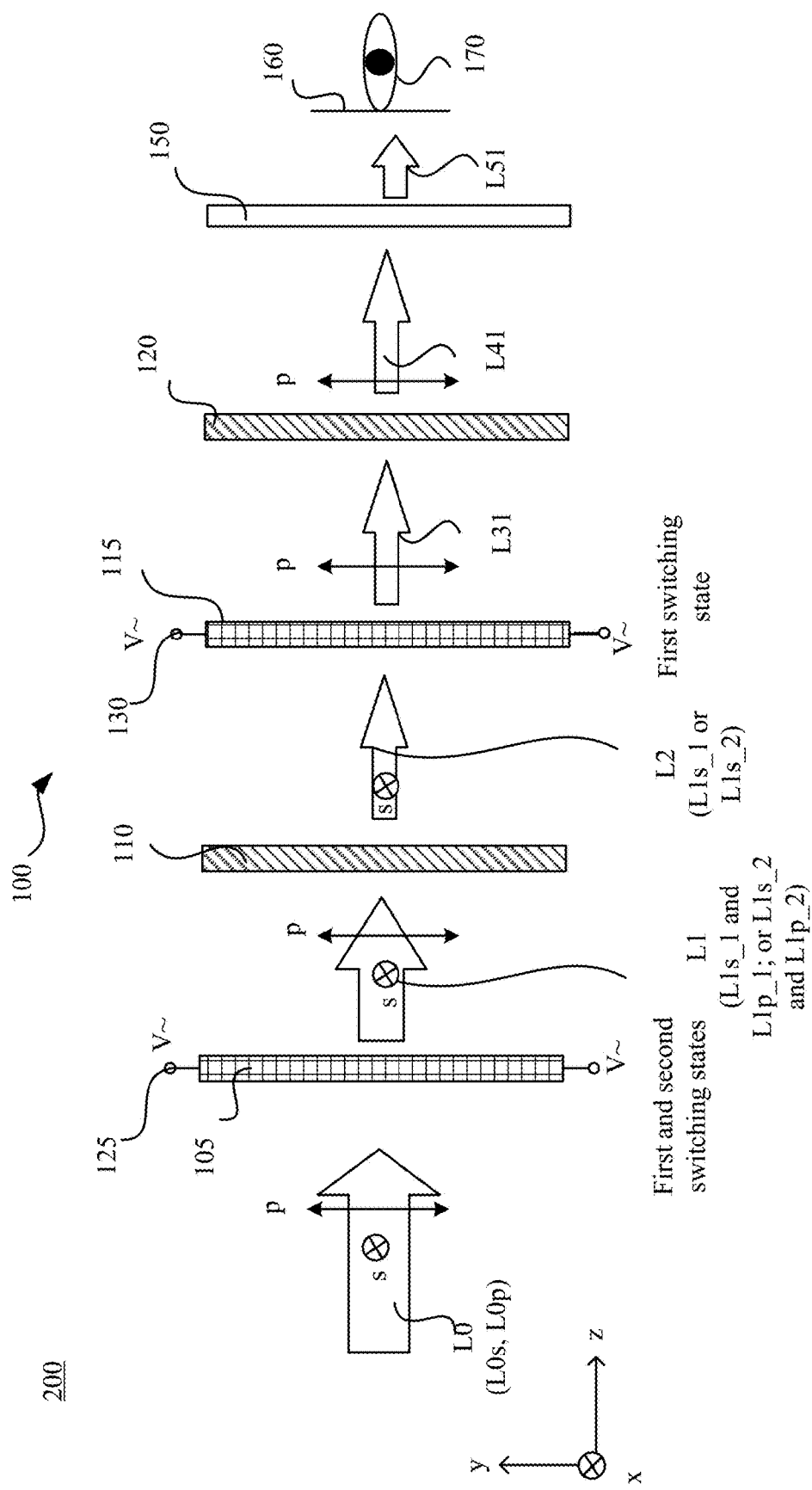
FIG. 2A illustrates a schematic diagram of an optical assembly including an optical dimming device at a clear state, according to an embodiment of the present disclosure.
Figure 2B:
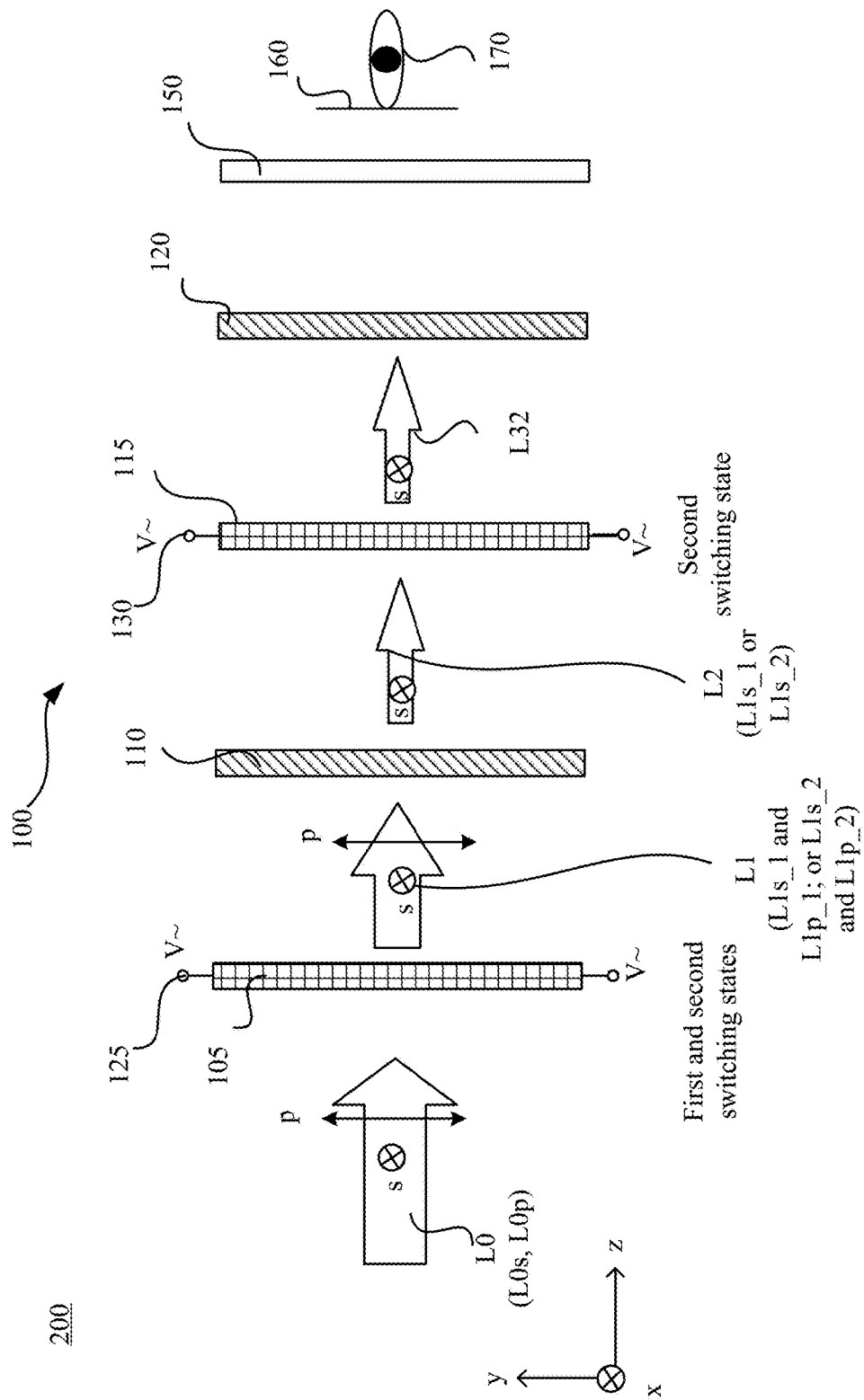
FIG. 2B illustrates a schematic diagram of the optical assembly including the optical dimming device at a dark state, according to an embodiment of the present disclosure.
Figure 2C:
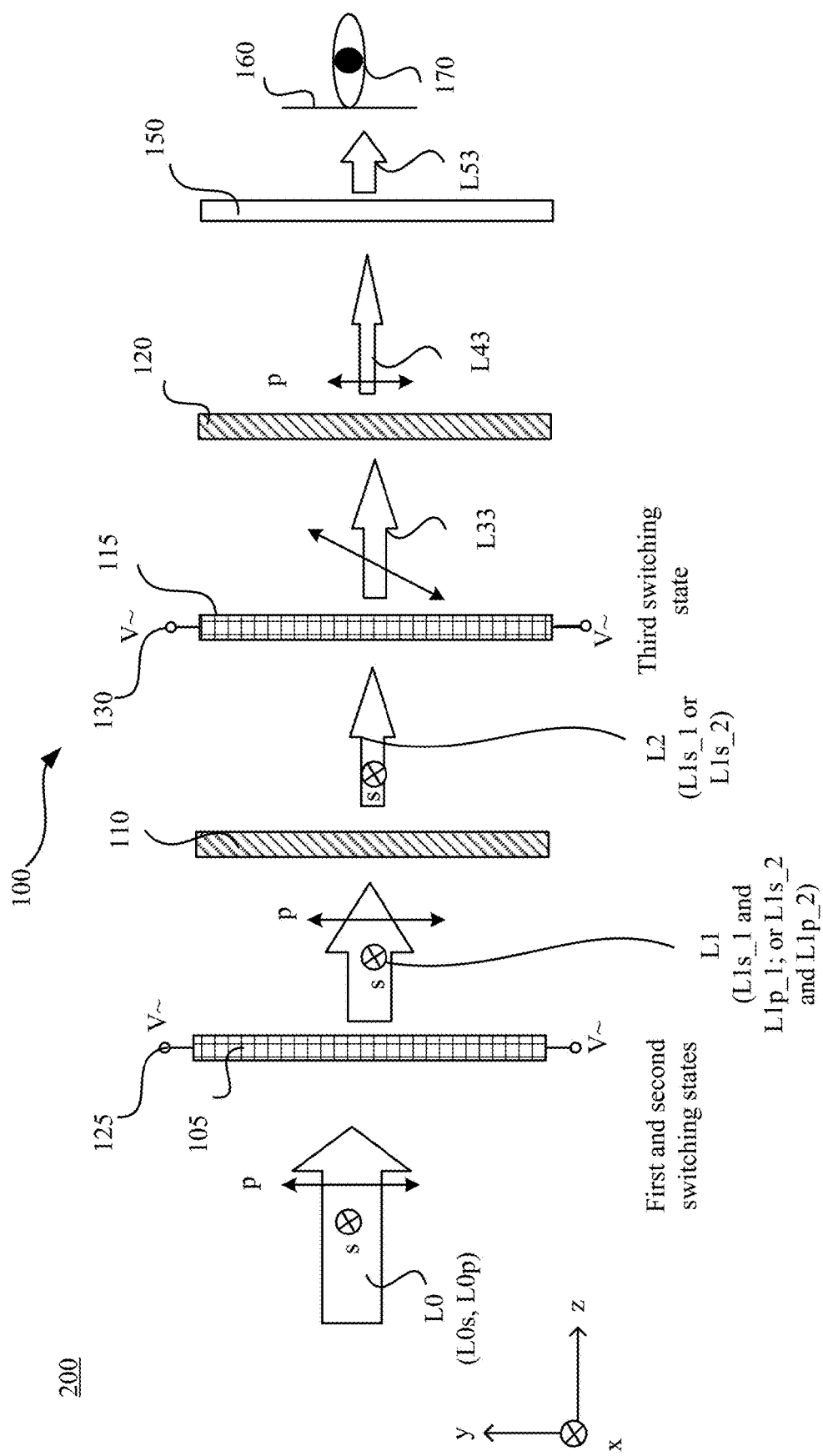
FIG. 2C illustrates a schematic diagram of the optical assembly including the optical dimming device at an intermediate state, according to an embodiment of the present disclosure.

FIGS. 2A-2C illustrate schematic diagrams of an optical assembly 200 including the polarization-agnostic optical dimming device 100 at respective operating states. For discussion purposes, FIGS. 2A-2C illustrate three respective operating states (e.g., a clear state, a dark state, and an intermediate state) of the polarization-agnostic optical dimming device 100. In FIGS. 2A-2C, the horizontal polarization may be in the first direction (e.g., an x-direction), and the vertical polarization may be in the second direction (e.g., a y-direction). The third direction and the transmission axis of the first polarizer 110 may be parallel to the first direction and the angle α may be zero. The fourth direction and the transmission axis of the second polarizer 120 may be orthogonal to the third polarization, and the angle θ may be 90°. That is, the transmission axis of the second polarizer 120 may be parallel to the second direction. In FIGS. 2A-2C, "s" and "p" represent an s-polarized light and a p-polarized light, respectively.

As shown in FIG. 2A, the incoming light L0 propagating along the +z direction may be decomposed into two substantially equal components that are linearly polarized lights with orthogonal polarizations and substantially same light intensity: a horizontally polarized light component (e.g., a light component polarized in the x-direction) and a vertically polarized light component (e.g., light component polarized in the y-direction). Each polarized light component may have an intensity that is about half (50%) of the initial intensity $I_{L0}$ of the incoming light L0. In FIGS. 2A-2C, for illustrative purposes, the horizontally polarized light component and vertically polarized light component may be referred to as an s-polarized incoming light L0s and a p-polarized incoming light L0p, respectively. In some embodiments, the incoming light L0 may be decomposed into two substantially equal components that are linearly polarized lights with orthogonal polarizations other than an s-polarized light (s) and a p-polarized light (p).

Referring to FIGS. 2A-2C, in the operation of the polarization-agnostic optical dimming device 100, the first polarization rotator 105 may be constantly switched between the first switching state and the second switching state at a predetermined high switching frequency. At the first switching state, the first polarization rotator 105 may transmit the p-polarized incoming light L0p as an s-polarized light L1s_1, and transmit the s-polarized incoming light L0s as a p-polarized light L1p_1. The first polarizer 110 having the transmission axis along the first direction (e.g., the x-direction) may transmit the s-polarized light L1s_1 as a linearly polarized light L2, and block the p-polarized light L1p_1.

The light intensity of the linearly polarized light L2 may be $0.5*I_{L0}$. At the second switching state, the first polarization rotator 105 may transmit the p-polarized incoming light L0p as a p-polarized light L1p_2 and transmit the s-polarized incoming light L0s as an s-polarized light L1s_2. The first polarizer 110 having the transmission axis along the first direction (e.g., the x-direction) may transmit the s-polarized light L1s_2 as a linearly polarized light L2, and block the p-polarized light L1p_2. The light intensity of the linearly polarized light L2 may be $0.5*I_{L0}$.

By constantly switching the first polarization rotator 105 between the first switching state and the second switching state at a predetermined high switching frequency, the linearly polarized light L2 output from the first polarizer 110 may have a light intensity of $0.5*I_{L0}$ regardless (e.g., independent) of the initial polarization state of the incoming light L0. That is, the combination of the first polarization rotator 105 and the first polarizer 110 may dim the incoming light L0 to about half (50%) of the initial light intensity regardless (e.g., independent) of the initial polarization state of the incoming light L0. In other words, the combination of the first polarization rotator 105 and the first polarizer 110 may provide a dimming effect at a substantially same predetermined percentage with respect to the initial light intensity of the incoming light L0 regardless (e.g., independent) of the initial polarization state of the incoming light L0. In some embodiments, the combination of the first polarization rotator 105 and the first polarizer 110 may dim the incoming light L0 to a predetermined percentage that is less than 50%, such as about 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, etc., of the initial light intensity of the incoming light L0, regardless (e.g., independent) of the initial polarization of the incoming light L0.

According to embodiments of the present disclosure, for different incoming lights having different initial polarizations, the polarization-agnostic optical dimming device 100 may reduce the intensities of the incoming lights to a substantially same percentage of the initial intensities of the incoming lights, regardless (e.g., independent) of the initial polarization of the incoming light L0. For example, when the user of the NED views a cell phone screen, the intensity of the light emitted by the cell phone screen may be reduced by the polarization-agnostic optical dimming device 100 to n % of the initial intensity of the light (n may be any suitable number between, e.g., about 20-50). When the user of the NED views a laptop screen, the intensity and/or the polarization of the light emitted by the laptop screen may be different from the intensity and/or polarization of the light emitted by the cell phone screen. The polarization-agnostic optical dimming device 100 may reduce the intensity of the light emitted by the laptop screen to the same n % of the initial intensity of the light. When the intensities of the lights having different polarizations are reduced to substantially the same percentage of the initial intensities of the lights, as the user views images generated by different light sources, a uniform dimming effect may be achieved. As a result, the operation of the NED may be simplified, and user experience of the NED may be improved. In the above examples, the phrase "a substantially same predetermined percentage" encompasses not only a single percentage, but also a small range around a single percentage. For example, the phrase includes n %, where n may be any number from 20 to 50. In some embodiments, the phase may include a suitable small range around n %, such as about n %±1%, n %±2%, or n %±3%, etc. For example, in some embodiments, when n %=50%, 49% may also be regarded as within the meaning of "a substantially same predetermined percentage," e.g., 50% and 49% may be regarded as a substantially same percentage. The small range may be determined based on actual applications.

In some embodiments, when the second polarization rotator 115 is switched to operate at the first switching state, as shown in FIG. 2A, the s-polarized light L2 may be converted into a p-polarized light L31 after propagating through the second polarization rotator 115. The second polarizer 120 having the transmission axis along the second direction (e.g., the y-direction) may transmit the p-polarized light L31 as a p-polarized light L41, resulting in a clear state for the polarization-agnostic optical dimming device 100. The p-polarized lights L31 and L41 may have a substantially same light intensity as the s-polarized light L2, e.g., about half (50%) of the light intensity of the incoming ambient light L0.

When the second polarization rotator 115 is switched to operate at the second switching state, as shown in FIG. 2B, the second polarization rotator 115 may transmit the s-polarized light L2 as an s-polarized light L32. The second polarizer 120 having the transmission axis along the second direction (e.g., the y-direction) may block the s-polarized light L32, resulting in a dark state for the polarization-agnostic optical dimming device 100.

In some embodiments, as shown in FIG. 2C, through controlling the external electric field applied to the second polarization rotator 115, the second polarization rotator 115 may be configured to be at a third switching state to switch the s-polarized light L2 to a linearly polarized light L33 having a sixth polarization other than the fourth and fifth polarizations (e.g., the sixth polarization different from the fourth and the fifth polarizations). The second polarization rotator 115 may output a linearly polarized light L33 having the sixth polarization toward the second polarizer 120. The light intensity of the linearly polarized light L33 may remain at $0.5*I_{L0}$. The second polarizer 120 may at least partially transmit the linearly polarized light L33 as a p-polarized light L43 with a light intensity of $0.5*I_{L0}*\cos^2(\gamma)$, resulting in an intermediate state for the polarization-agnostic optical dimming device 100. When the polarization-agnostic optical dimming device 100 is at the intermediate state, a light transmitted by the polarization-agnostic optical dimming device 100 may have a light intensity that is between a maximum transmitted light intensity (e.g., $0.5*I_{L0}$) when the polarization-agnostic optical dimming device 100 at the clear state and a minimum transmitted light intensity (e.g., 0) when the polarization-agnostic optical dimming device 100 is at the dark state.

Figure 3A:
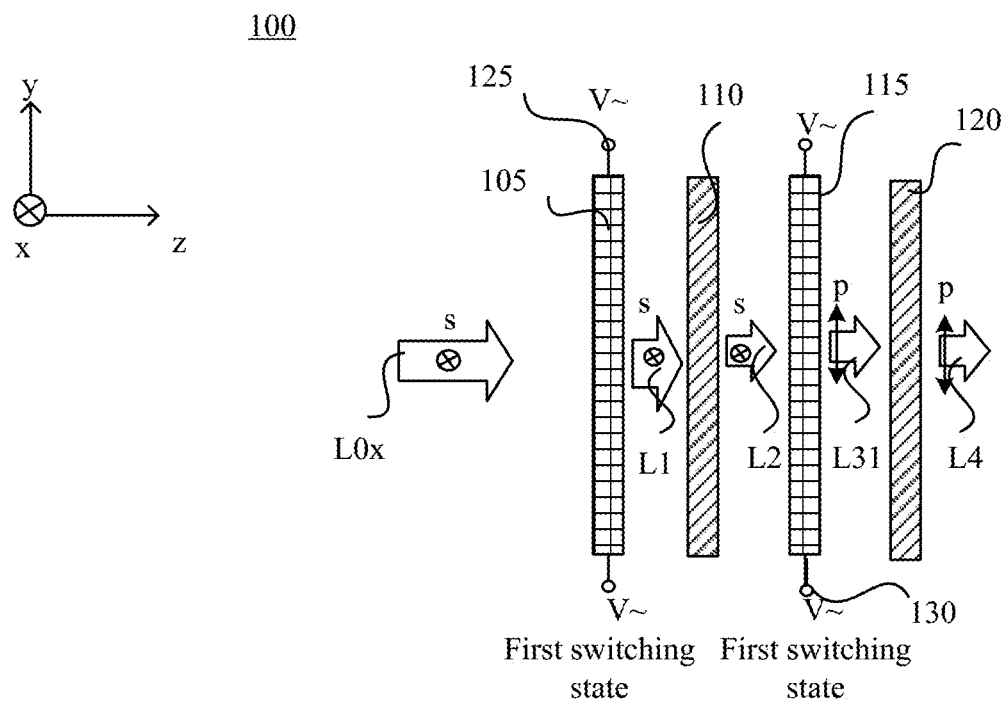
FIG. 3A illustrates a schematic diagram of a polarization-agnostic optical dimming device at a clear state, in which a first polarization rotator and a second polarization rotator are at a first switching state, according to another embodiment of the present disclosure.
Figure 3B:
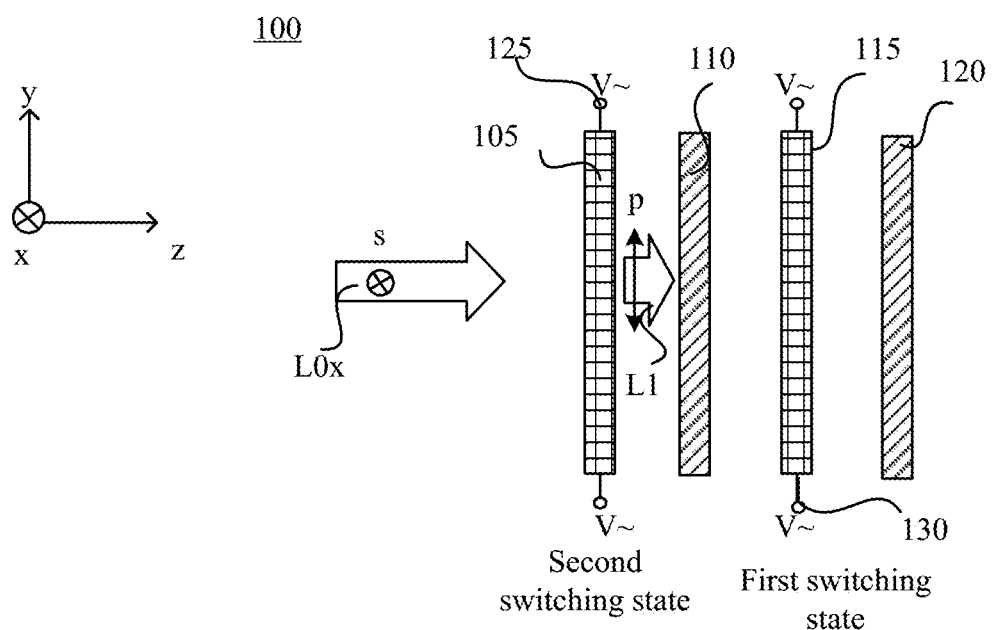
FIG. 3B illustrates a schematic diagram of a polarization-agnostic optical dimming device at a clear state, in which a first polarization rotator is at a second switching state, and a second polarization rotator is at a first switching state, according to another embodiment of the present disclosure.
Figure 3C:
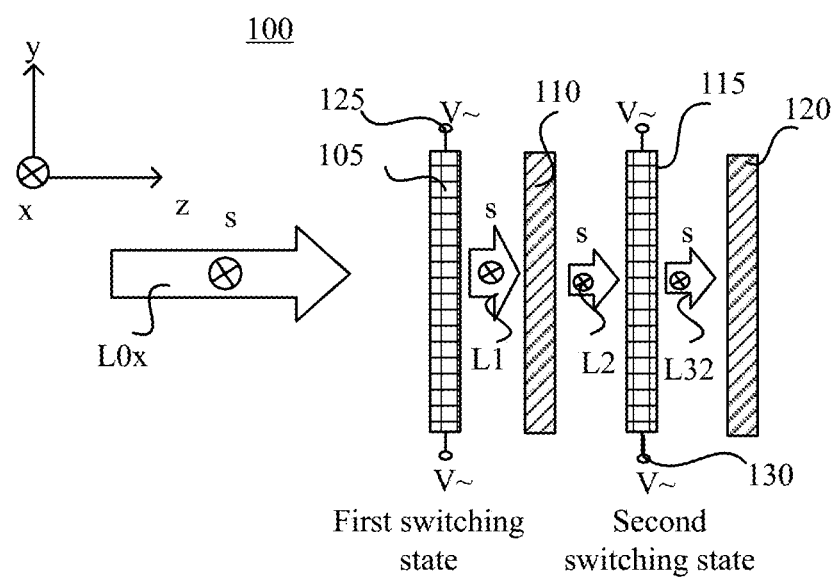
FIG. 3C illustrates a schematic diagram of a polarization-agnostic optical dimming device at a dark state, in which a first polarization rotator is at a first switching state, and a second polarization rotator is at a second switching state, according to another embodiment of the present disclosure.
Figure 3D:
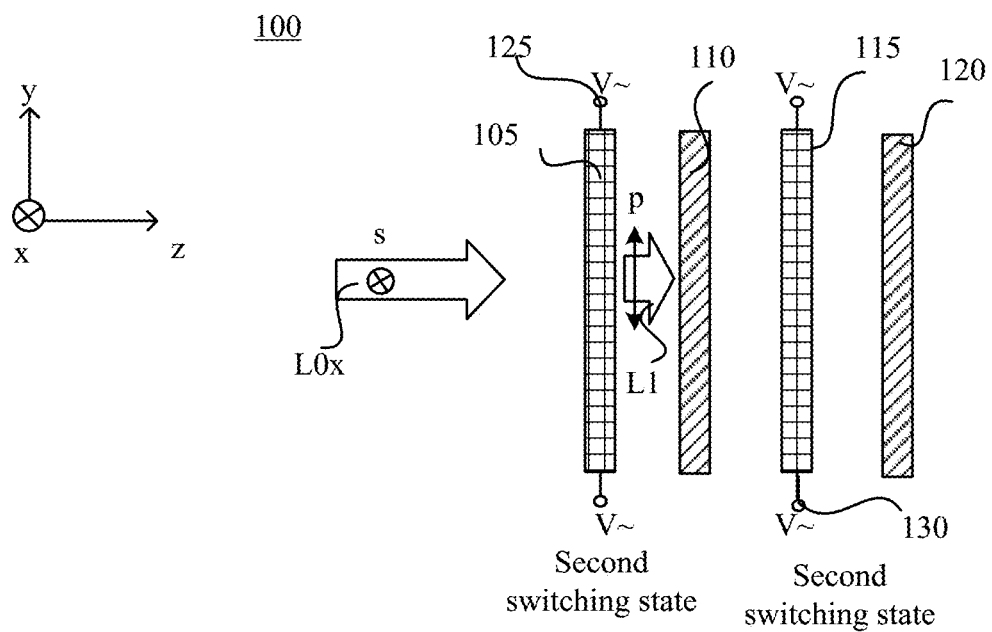
FIG. 3D illustrates a schematic diagram of a polarization-agnostic optical dimming device at a dark state, in which a first polarization rotator is at a second switching state, and a second polarization rotator is at a second switching state, according to another embodiment of the present disclosure.

FIG. 3A illustrates a schematic diagram of a polarization-agnostic optical dimming device at a clear state, in which each of a first polarization rotator and a second polarization rotator is at a first switching state. FIG. 3B illustrates a schematic diagram of the polarization-agnostic optical dimming device at the clear state, in which a first polarization rotator is at a second switching state, and a second polarization rotator is at a first switching state. FIG. 3C illustrates a schematic diagram of a polarization-agnostic optical dimming device at a dark state, in which a first polarization rotator is at a first switching state, and a second polarization rotator is at a second switching state. FIG. 3D illustrates a schematic diagram of a polarization-agnostic optical dimming device at a dark state, in which a first polarization rotator is at a second switching state, and a second polarization rotator is at a second switching state.

FIGS. 3A and 3B illustrate a clear state of the polarization-agnostic optical dimming device 100 for a linearly polarized incoming light L0x having a horizontal polarization, and FIGS. 3C and 3D illustrate a dark state of the polarization-agnostic optical dimming device 100 for the linearly polarized incoming light L0x having the horizontal polarization. For discussion purposes, in FIGS. 3A-3D, the horizontal polarization may be along a first direction (e.g., an x direction), and the incoming light L0x may be referred to as an s-polarized light. Similar to the embodiment shown in FIGS. 2A-2C, in the embodiment shown in FIGS. 3A-3D, the third direction and the transmission axis of the first polarizer 110 may be parallel to the first direction and the angle α may be 0 degree. The fourth direction and the transmission axis of the second polarizer 120 may be orthogonal to the third polarization, and the angle θ may be 90°. That is, the transmission axis of the second polarizer 120 may be parallel to the second direction. In FIGS. 3A-3D, "s" and "p" represent an s-polarized light and a p-polarized light, respectively.

Referring to FIGS. 3A and 3B, the first polarization rotator 105 may be constantly switched between the first switching state (shown in FIG. 3A) and the second switching state (shown in FIG. 3B) at a predetermined high switching frequency, thereby switching a polarization of the s-polarized incoming light L0x between two orthogonal polarizations. In some embodiments, at the first switching state, as shown in FIG. 3A, the first polarization rotator 105 may transmit the s-polarized incoming light L0x as an s-polarized light L1 having the same intensity as the s-polarized incoming light L0x. The first polarizer 110 having a transmission axis along the first direction (e.g., the x-direction shown in FIG. 3A) may transmit the s-polarized light L1 as an s-polarized light L2. At the second switching state, as shown in FIG. 3B, the first polarization rotator 105 may transmit the s-polarized incoming light L0x as a p-polarized light L1 having the same intensity as the s-polarized incoming light L0x. The first polarizer 110 having a transmission axis along the first direction (e.g., the x-direction in FIG. 3B) may block the p-polarized light L1.

In the embodiment shown in FIG. 3A and FIG. 3B, through constantly switching the first polarization rotator 105 between the first switching state (shown in FIG. 3A) and the second switching state (shown in FIG. 3B) at a predetermined high switching frequency, the light L1 output from the first polarization rotator 105 may be switched between a p-polarized light and an s-polarized light at a predetermined high switching frequency. The first polarizer 110 having a transmission axis along the first direction (e.g., the x-direction shown in FIGS. 3A and 3B) may transmit the s-polarized light and block the p-polarized light. In some embodiments, through constantly switching the first polarization rotator 105 between the first switching state and the second switching state at a predetermined high switching frequency, the light intensity of the s-polarized light L2 output from the first polarizer 110 may be reduced to about half (50%) of the light intensity of the s-polarized incoming light L0x from the real world environment. That is, the combination of the first polarization rotator 105 and the first polarizer 110 may dim the s-polarized incoming light L0x from the real world environment to about half (50%) of the initial light intensity of the s-polarized incoming light L0x. The half (50%) is an example of a predetermined percentage. The predetermined percentage may be other suitable percentages that are substantially 50%, e.g., about 49%, 48%, 47%, etc., or may be a percentage within a small range around 50%, e.g., about 45%-50%. As shown in FIG. 3A, when the second polarization rotator 115 is at the first switching state, the second polarization rotator 115 may transmit the s-polarized light L2 as a p-polarized light L31. The second polarizer 120 having a transmission axis in the second direction (e.g., the y-direction shown in FIG. 3A) may transmit the p-polarized light L31 as a p-polarized light L4, resulting in a clear state for the polarization-agnostic optical dimming device 100. Referring to FIG. 3A, through controlling the external electric field applied to the second polarization rotator 115, the second polarization rotator 115 may be configured to transmit the s-polarized light L2 as a linearly polarized light rather than an s-polarized light or a p-polarized light, resulting in an intermediate state for the polarization-agnostic optical dimming device 100.

FIG. 3C and FIG. 3D illustrate a dark state of the polarization-agnostic optical dimming device 100. As shown in FIG. 3C, the first polarization rotator 105 is at a first switching state, and the second polarization rotator 115 is at a second switching state. As shown in FIG. 3D, the first polarization rotator 105 is at a second switching state, and the second polarization rotator 115 is at a second switching state. In some embodiments, the first polarization rotator 105 may be constantly switched between the first switching state (shown in FIG. 3C) and the second switching state (shown in FIG. 3D) at a predetermined high switching frequency, such that the light intensity of the s-polarized light L2 output from the first polarizer 110 may be reduced to about half (50%) of the light intensity of the s-polarized incoming light L0x from the real world environment. The half (50%) is an example of a predetermined percentage. The predetermined percentage may be other suitable percentages that are substantially 50%, e.g., about 49%, 48%, 47%, etc., or may be a percentage within a small range around 50%, e.g., about 45%-50%. When the second polarization rotator 115 is at the second switching state, as shown in FIG. 3C, the second polarization rotator 115 may transmit the s-polarized light L2 as an s-polarized light L32. The second polarizer 120 having a transmission axis in the second direction (e.g., the y-direction shown in FIG. 3C) may block the s-polarized light L32, resulting in a dark state for the polarization-agnostic optical dimming device 100.

When a linearly polarized incoming light L0y (not shown in figures) having a vertical polarization (e.g., the linearly polarized incoming light L0y may be referred to as a p-polarized incoming light) is incident onto the polarization-agnostic optical dimming device 100, the light propagation of the linearly polarized incoming light L0y may be analyzed in a manner similar to that described above in connection with FIGS. 3A-3D, where an s-polarized incoming light is used as an example. For a vertically polarized incoming light, the combination of the first polarization rotator 105 and the first polarizer 110 may dim the p-polarized incoming light L0y to about half (50%) of the initial light intensity of the p-polarized incoming light L0y. The half (50%) is an example of a predetermined percentage. The predetermined percentage may be other percentages that are substantially 50%, such as about 49%, 48%, 47%, etc., or may be a small range around 50%, e.g., about 45%-50%. The clear state, dark state, and intermediate state of the polarization-agnostic optical dimming device 100 may be controlled by controlling the switching states of the second polarization rotator 115, in a manner similar to that described above in connection with FIGS. 3A-3D. Regardless (e.g., independent) of the polarizations of the different incoming light incident onto the polarization-agnostic optical dimming device 100, the polarization-agnostic optical dimming device 100 may reduce the intensity of the incoming lights to a same predetermined percentage of the initial intensities of the incoming lights (e.g., about 50%, 49%, 48%, 47%, 46%, 45%, etc.), thereby improving user experience of an NED that includes the polarization-agnostic optical dimming device 100.

FIGS. 3A-3D show a situation in which the linearly polarized component of an incoming light is substantially equal to the entire incoming light (or that the entire incoming light is a substantially linearly polarized light). The principles described above in connection with FIGS. 1A-1C and FIGS. 2A-2C may be applicable to the situation illustrated in FIGS. 3A-3D, as a polarized incident light or an unpolarized incident light may be decomposed into a horizontal component and a vertical component. The terms "horizontal" and "vertical" used herein are defined with respect to the fast axes or polarization axes of the optical components included in the polarization-agnostic optical dimming device 100. The polarization rotators and polarizers may be arranged in any suitable orientations relative to the absolute horizontal and vertical directions shown in FIGS. 2A-2C.

In some embodiments, the polarization-agnostic optical dimming device 100 may be implemented in an optical device, e.g., an NED, to control a light transmittance of an ambient light (e.g., an ambient image light from an ambient electronic screen) that propagates through the NED to reach one or two eyes of a user of the NED. When the NED is an optically see-through NED for AR and/or MR applications, the polarization-agnostic optical dimming device 100 may be configured to dim the ambient light (e.g., an ambient image light from an ambient electronic screen) to a substantially same predetermined percentage of an initial intensity of the ambient incoming light, regardless (e.g., independent) of an initial polarization of the ambient incoming light. In some embodiments, when the user of the optically see-though NED looks at a variety of screens, for example, a cell phone screen, a TV screen, a laptop screen, which emit lights of different initial polarizations, the user may observe a substantially same level (or percentage) of dimming of the intensities of the different screens. In some embodiments, the polarization-agnostic optical dimming device 100 may be configured to control the light transmittance of the ambient light (e.g., via controlling the switching states of the second polarization rotator 115), thereby switching the NED between an optically see-though NED for AR and/or MR applications and an NED for VR applications. For example, the NED may be switched to an optically see-though NED for AR and/or MR applications by switching the polarization-agnostic optical dimming device 100 to the clear state or the intermediate state, and to an NED for VR applications by switching the polarization-agnostic optical dimming device 100 to the dark state. In some embodiments, when the NED is used for AR and/or MR applications, the polarization-agnostic optical dimming device 100 may mitigate the difference in brightness of real world and virtual scenes, for example, by switching the polarization-agnostic optical dimming device 100 to the intermediate state. The polarization-agnostic optical dimming device 100 may be a component of the NED, or may be a component of a device other than the NED.

Referring back to FIGS. 2A-2C, FIGS. 2A-2C illustrate schematic diagrams of the optical assembly 200 including the polarization-agnostic optical dimming device 100 at respective operating states, e.g., a clear state, a dark state, and an intermediate state. The optical assembly 200 may be a component of an optically see-through NED or an NED that is switchable to an optically see-through NED. The optical assembly 200 may include a light source assembly (not shown) configured to generate an image light (which may be referred to as an "internal image light" to distinguish from an ambient image light emitted by an electronic screen from the real world environment). The optical assembly 200 may include an optical combiner 150 optically coupled with the second polarizer 120. The optical combiner 150 may be configured to combine the internal image light from the light source assembly (not shown) and a light from the real world environment (e.g., an ambient image light emitted by an electronic screen from the real world environment and transmitted through the first polarization rotator 105, the first polarizer 110, the second polarization rotator 115, and the second polarizer 120). The optical combiner 150 may be configured to output a combined image light toward an eye-box 160 of the optical assembly 200. An eye pupil 170 of the user may be positioned within the eye-box 160 region when the user operates or uses the optical assembly 200 (e.g., when the user wears an NED that includes the optical assembly 200). The optical combiner 150 may include a first side or surface (e.g., the left side in the view of FIG. 2A) facing the real world environment and an opposing second side or surface (e.g., the right side in the view of FIG. 2A) facing the eye pupil 170 of the user. The polarization-agnostic optical dimming device 100 may be disposed at the first side of the optical combiner 150. In some embodiments, the optical combiner 150 may include an image combiner, which may be configured to combine the internal image light emitted by the light source assembly and the light from the real world environment (e.g., an ambient image light from an ambient electronic screen), and output a combined image light toward the eye-box 160, thereby enabling the user to perceive a virtual scene superimposed on the user's view of the real world scene. The image combiner 150 may include any suitable optically transparent image combiner, such as a waveguide combiner, or a holographic optical element ("HOE") combiner, or a combination thereof. The image combiner 150 and the light source assembly may form a transparent display system.

As shown in FIG. 2A, the polarization-agnostic optical dimming device 100 at the clear state may transmit the incoming ambient light L0 as the p-polarized light L41 with a light intensity of $0.5*I_{L0}$, where $I_{L0}$ is the initial light intensity of the incoming ambient light L0. The optical combiner 150 may transmit the p-polarized light L41 as a light L51, which may be focused onto the eye 170. As shown in FIG. 2B, the polarization-agnostic optical dimming device 100 at the dark state may not output a light toward the optical combiner 150. As shown in FIG. 2C, the polarization-agnostic optical dimming device 100 at the intermediate state may transmit the incoming ambient light L0 as the p-polarized light L43 with a light intensity of $0.5*I_{L0}*\cos^2(\gamma)$. The optical combiner 150 may transmit the p-polarized light L43 as a light L53, which may be focused onto the eye 170. Referring to FIG. 2A and FIG. 2C, the properties (e.g., polarization, light intensity) of the lights L51 and L53 may be determined by the properties of the optical combiner 150. For example, the polarization and/or light intensity of a light output from the optical combiner 150 may be the same as or different from that of an input light incident onto the optical combiner 150.

Through configuring the polarization-agnostic optical dimming device 100 to be at the clear state or the intermediate state, the light intensity of an incoming light may be reduced to a substantially same predetermined level (or percentage) of the initial light intensity of the incoming light L0, regardless (e.g., independent) of the initial polarization of the incoming light L0. In some embodiments, the images displayed on different ambient electronic screens may be readily perceivable by a user of the optical assembly 200, regardless (e.g., independent) of the polarizations of the image lights emitted from the respective ambient electronic screens. In some embodiments, the polarization-agnostic optical dimming device 100 at the intermediate state may be configured to mitigate the difference in brightness of the real world and virtual scenes for the AR/MR applications. The polarization-agnostic optical dimming device 100 at the dark state may render the optical assembly 200 suitable for VR applications, in which lights from the real world environment may be blocked. Through switching the polarization-agnostic optical dimming device 100 between the clear or intermediate state, and the dark state, the NED may be switchable between functioning as an AR device and/or a MR device and functioning as a VR device. In some embodiments, when the polarization-agnostic optical dimming device 100 is implemented in an NED for AR and/or MR applications and not for VR applications, the second polarization rotator 115 and the second polarizer 120 may be omitted.

Figure 4A:
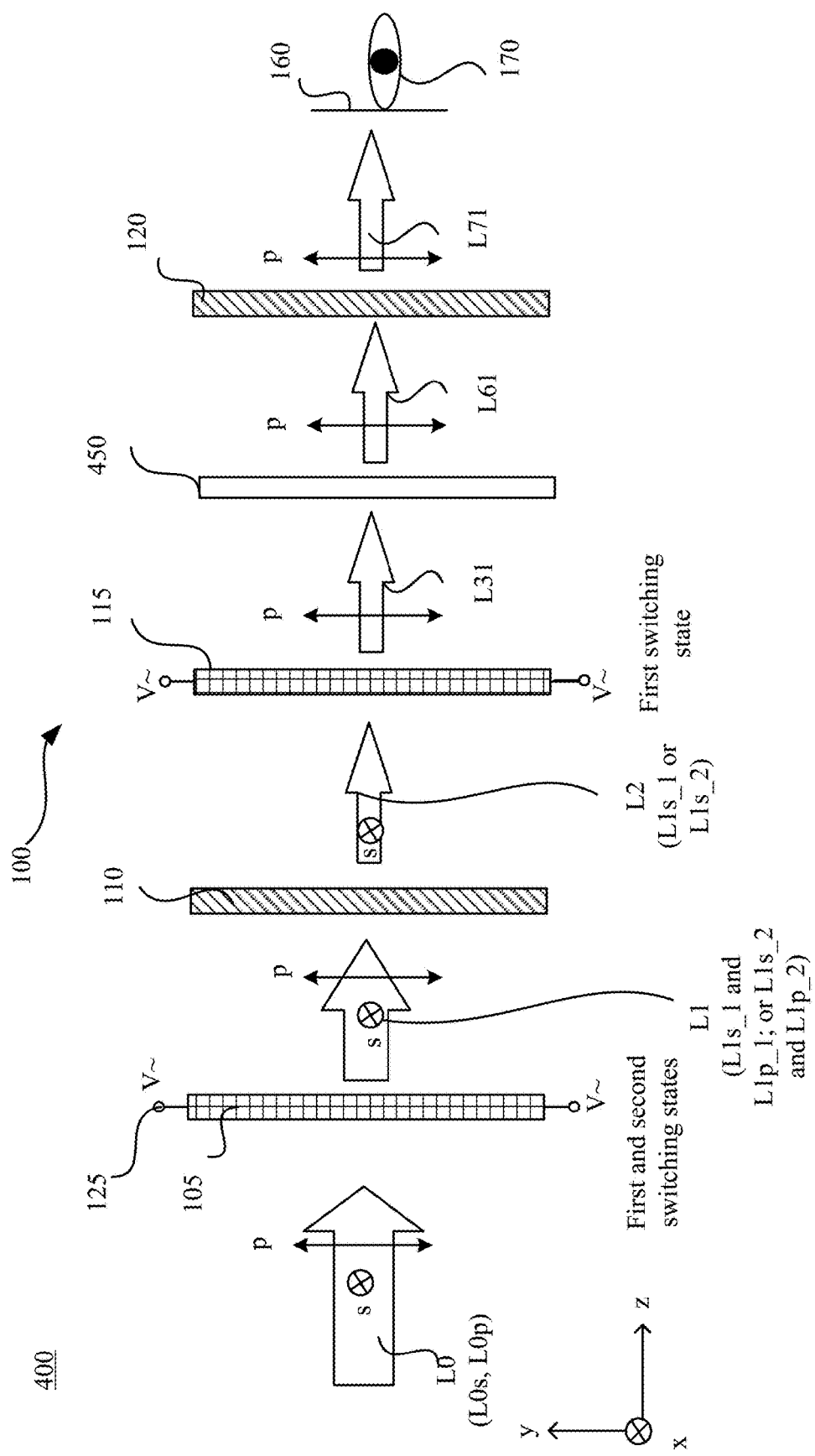
FIG. 4A illustrates a schematic diagram of an optical assembly including an optical dimming device at a clear state, according to another embodiment of the present disclosure.
Figure 4B:
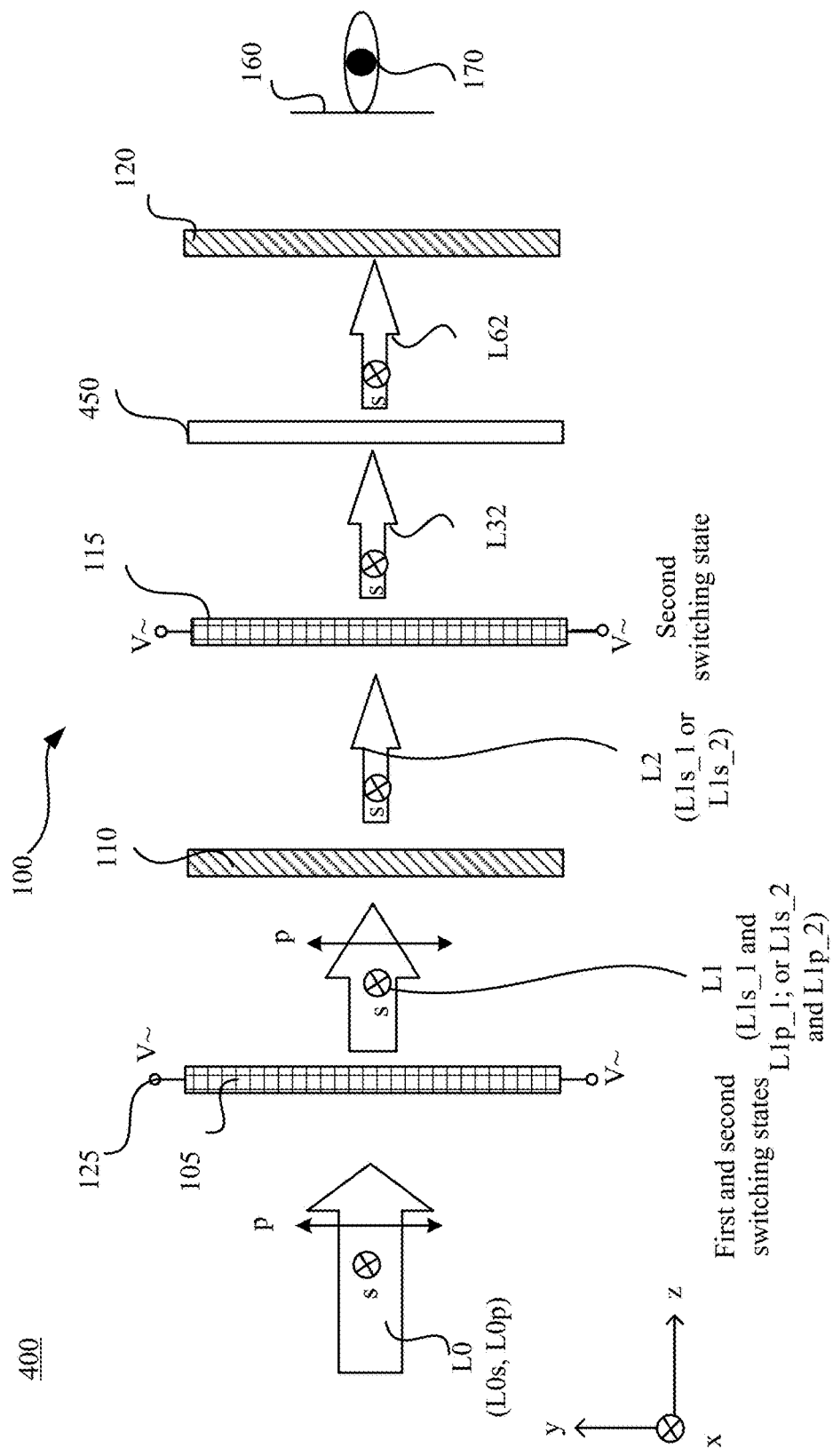
FIG. 4B illustrates a schematic diagram of the optical assembly including the optical dimming device at a dark state, according to another embodiment of the present disclosure.
Figure 4C:
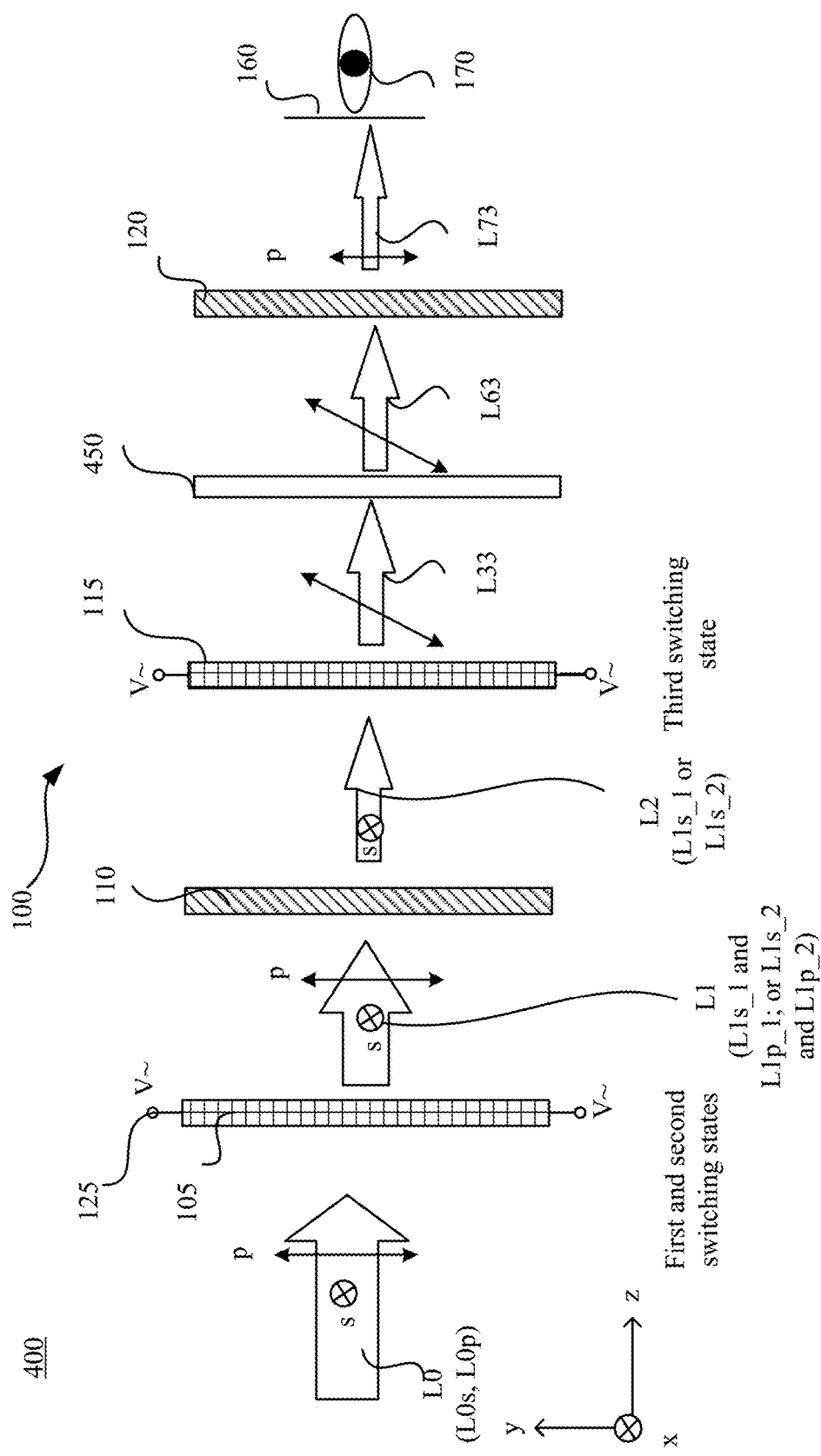
FIG. 4C illustrates a schematic diagram of the optical assembly including the optical dimming device at an intermediate state, according to another embodiment of the present disclosure.

FIGS. 4A-4C illustrate schematic diagrams of an optical assembly 400 including the polarization-agnostic optical dimming device 100 at respective operating states. The optical assembly 400 shown in FIG. 4A may include elements that are the same as or similar to those included in the optical assembly 200 shown in FIG. 2A. Detailed descriptions of the same or similar elements may refer to the above descriptions rendered in connection with FIG. 2A. As shown in FIG. 4A, in some embodiments, an optical combiner 450 may be disposed between the second polarization rotator 115 and the second polarizer 120.

In some embodiments, the optical combiner 450 may be configured to transmit a light received from the second polarization rotator 115 without affecting the polarization of the light (or with negligible effect on the polarization of the light). For example, as shown in FIG. 4A, the optical combiner 450 may transmit the p-polarized light L31 as a p-polarized light L61 without affecting the polarization state. The light intensity of the p-polarized light L61 may be determined by the properties of the optical combiner 450. The second polarizer 120 having the transmission axis along the second direction (e.g., the y-direction shown in FIG. 4A) may transmit the p-polarized light L61 as a p-polarized light L71, which may be focused onto the eye 170. Accordingly, the polarization-agnostic optical dimming device 100 may be at the clear state, and the eye 170 may receive lights from an ambient real world environment.

As shown in FIG. 4B, the optical combiner 450 may transmit the s-polarized light L32 as an s-polarized light L62 without affecting the polarization state. The second polarizer 120 having the transmission axis along the second direction (e.g., the y-direction shown in FIG. 4B) may block the p-polarized light L62. Accordingly, the polarization-agnostic optical dimming device 100 may be at the dark state, and the eye 170 may not receive lights from an ambient real world environment.

As shown in FIG. 4C, the optical combiner 450 may transmit a linearly polarized light L33 having the sixth polarization direction as a linearly polarized light L63 without affecting the polarization state. The second polarizer 120 having the transmission axis along the second direction (e.g., the y-direction shown in FIG. 4C) may transmit the linearly polarized light L63 as a p-polarized light L73, which may be focused onto the eye 170. The light intensity of the p-polarized light L73 may be reduced to $\cos^2(\gamma)$ of the light intensity of the linearly polarized light L63, where $\gamma$ is the angle between the polarization direction of the p-polarized light L73 and the transmission axis of the second polarizer 120.

In some embodiments, while transmitting a light received from the second polarization rotator 115, the optical combiner 450 may cause an unintended polarization rotation in the light due to, e.g., the material properties of the optical combiner 450. As a result, the light transmittance at the respective operating states of the polarization-agnostic optical dimming device 100 may be affected. For example, the light transmittance of the polarization-agnostic optical dimming device 100 may be nonzero (or not negligible) at the dark state. In other words, the dark state of the polarization-agnostic optical dimming device 100 may not appear fully dark to a user. In such situations, the optical combiner 450 may be coupled to one or more optical compensation elements (e.g., compensation films). The one or more optical compensation elements may compensate for the unintended polarization rotation caused by the optical combiner 450. As a result, the desirable operating state of the polarization-agnostic optical dimming device 100 may not be affected.

Figure 4D:
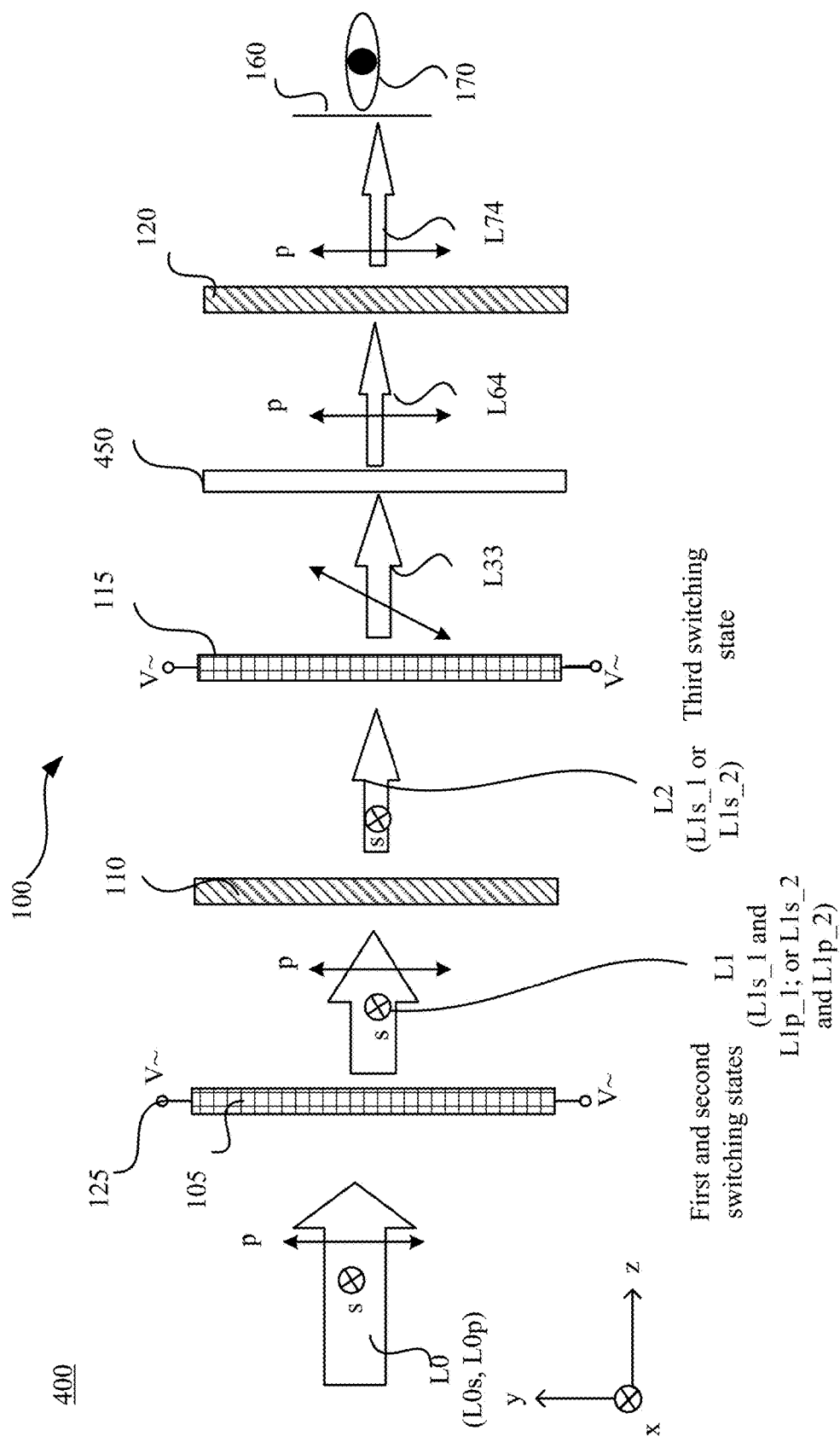
FIG. 4D illustrates a schematic diagram of the optical assembly including the optical dimming device at an intermediate state, according to another embodiment of the present disclosure.

In some embodiments, the optical assembly 400 may be included in an NED configured for AR and/or MR applications and not for VR applications. Accordingly, the optical combiner 450 may be configured to transmit a light received from the second polarization rotator 115 as a linearly polarized light having a polarization direction parallel to the transmission axis of the second polarizer 120. For example, as shown in FIG. 4A, the optical combiner 450 may transmit the p-polarized light L31 as a p-polarized light L61. The light intensity of the p-polarized light L61 may be determined by the properties of the optical combiner 450. The second polarizer 120 having the transmission axis along the second direction (e.g., the y-direction shown in FIG. 4A) may transmit the p-polarized light L61 as a p-polarized light L71, which may be focused onto the eye 170. Accordingly, the polarization-agnostic optical dimming device 100 may be at the clear state, and the eye 170 may receive lights from an ambient real world environment. As shown in FIG. 4D, the optical combiner 450 may transmit the linearly polarized light L33 having the sixth polarization direction as a p-polarized light L64. In some embodiments, the light intensity of the p-polarized light L64 may be reduced relative to the light intensity of the linearly polarized light L33, depending an orientation between the polarization direction of the linearly polarized light L33 and the polarization axis of the optical combiner 450. An unintended polarization rotation caused by the optical combiner 450 may be compensated for, and the operating state of the polarization-agnostic optical dimming device 100 may not be affected.

Referring to FIGS. 1A-4D, in some embodiments, each of the first polarization rotator 105 and the second polarization rotator 115 may be an active polarization rotator that includes an LC cell, such as a twisted-nematic LC ("TNLC") cell. The TNLC cell may rotate the polarization of a linearly polarized incoming light by about 90° when a voltage applied to the TNLC cell is switched-off or below a threshold voltage, and maintain the polarization of the linearly polarized incoming light when the voltage is switched-on and is sufficiently high to re-orient the LC molecules along the electric field direction. The TNLC cell may be switched at a frequency or rate of about 90 Hz to 100 Hz, which may satisfy the switching frequency of the second polarization rotator 115 and may not satisfy the switching frequency of the first polarization rotator 105. For higher switching frequencies of up to about 1000 Hz, a type of LC cell named Pi-cell may be used in the active polarization rotator. In a Pi-cell, the twist of LC molecules may be 180° formed by parallel alignment directions on two opposite substrates disposed at two sides of an LC layer. The high switching frequency may be a result of fluid dynamics. When a voltage is removed from a Pi-cell operated at a relative high voltage state (e.g., a homeotropic state), the LC molecules may be subject to an insufficient torque and, thus, may not return to the low voltage state (e.g., a bend state). During an operation of the Pi-cell, a "holding" voltage at the low voltage state may be provided to maintain polarization switching. The Pi-cell may be operated between a high voltage state (e.g., about 10 Volts or 10 V) and a low holding voltage state (e.g., about 2 Volts or 2 V) with a high switching frequency in the order of about 1000 Hz (e.g., the switching time period may be in the order of milliseconds ("ms"). In some embodiments, the Pi-cell may have high viewing angles due to the symmetrical LC molecules alignment at surface boundaries.

Figure 5A:
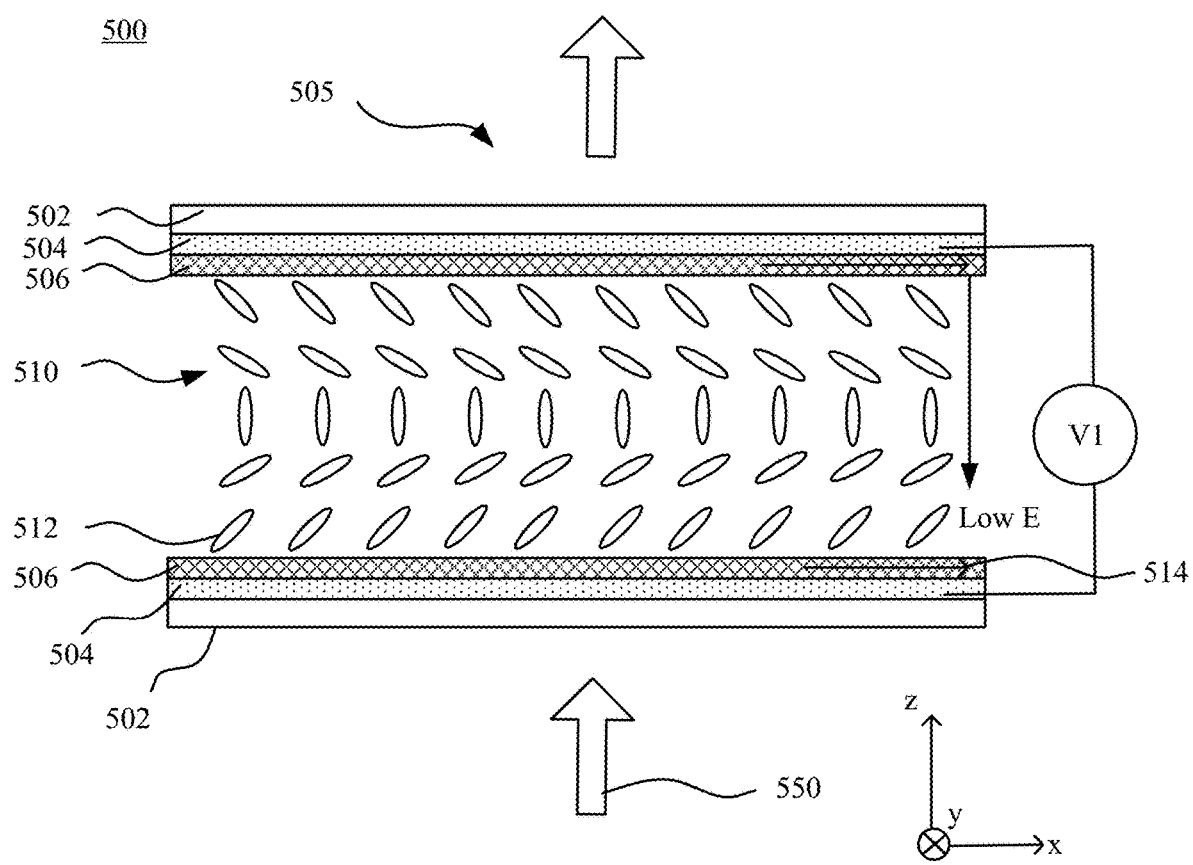
FIG. 5A illustrates a schematic diagram of a polarization rotator at a first switching state, according to an embodiment of the present disclosure.
Figure 5B:
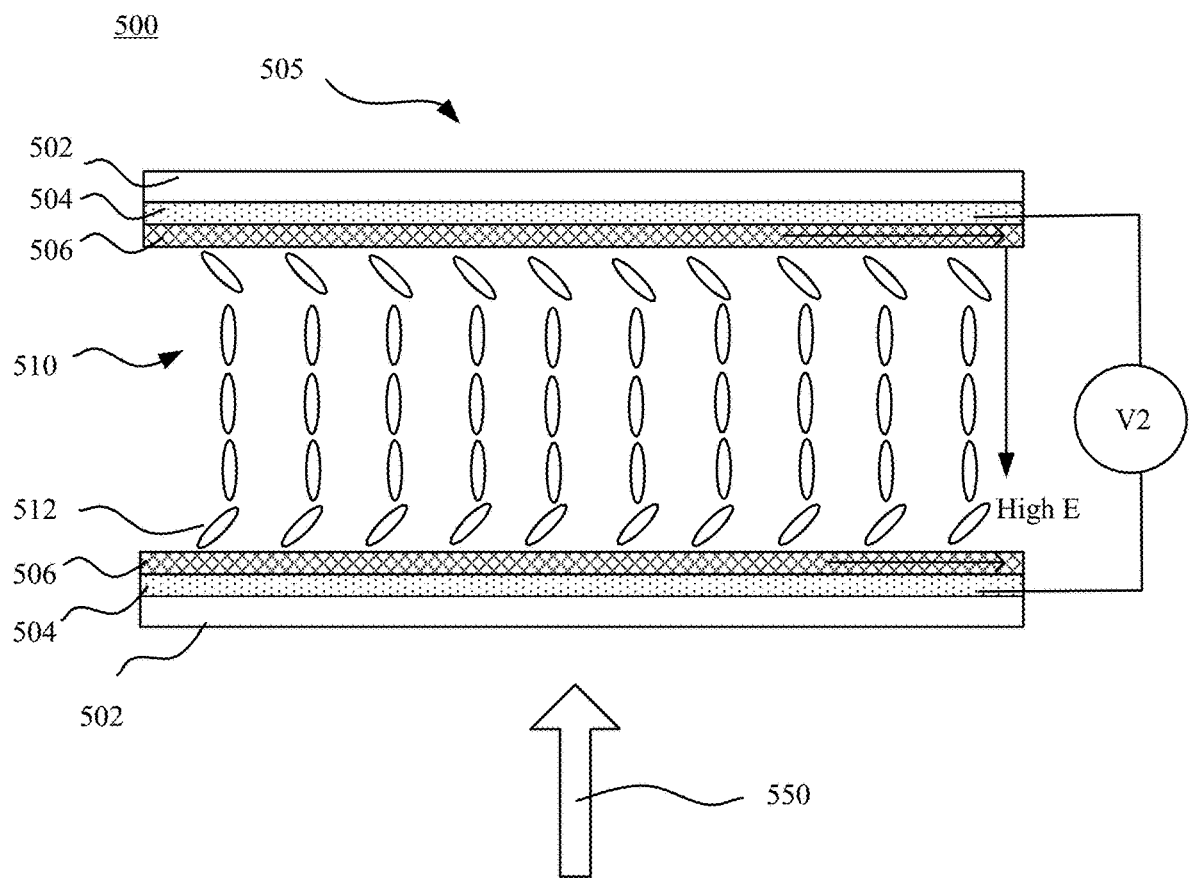
FIG. 5B illustrates a schematic diagram of the polarization rotator at a second switching state, according to an embodiment of the present disclosure.

FIGS. 5A-5B are schematic diagrams illustrating a polarization rotator in two respective switching states. The polarization rotator 500 may be an embodiment of the first polarization rotator 105. In some embodiments, the polarization rotator 500 may be an embodiment of the second polarization rotator 115. As shown in FIG. 5A, the polarization rotator 500 may include a Pi-cell 505. In some embodiments, the Pi-cell 505 may be configured to function as a switchable half-wave plate ("SHWP"). The Pi-cell 505 may include upper and lower substrates 502 arranged opposing one another. An LC layer 510 may be disposed or sandwiched between the upper and lower substrates 502. In some embodiments, the upper and lower substrates 502 may be substantially transparent in the visible spectrum or band (about 380 nm to about 700 nm). In some embodiments, the upper and lower substrates 502 may be transparent in at least a portion of the infrared ("IR") spectrum or band (about 700 nm to about 1 mm). The upper and lower substrates 502 may include a suitable material that is substantially transparent to the light of above-listed wavelengths range (or spectrum, band), e.g., glass, plastic, sapphire, etc. Conductive electrodes 504 including, e.g., indium tin oxide ("ITO") or graphene, may be disposed at opposing surfaces of the upper and lower substrates 502. The conductive electrodes 504 may be configured to apply an electric field to the LC layer 510.

The polarization rotator 500 may include one or more alignment layers. For example, two alignment layers 506 may be disposed at opposing surfaces of the conductive electrodes 504. The LC layer 510, which may include nematic LC molecules 512, may be sandwiched or disposed between the two alignment layers 506. The two alignment layers 506 may be configured with a homogeneous parallel alignment direction. For example, the homogeneous parallel alignment direction may be in an x-direction as indicated by an arrow 514 (for convenience, the arrow 514 may be referred to as an alignment direction 514). In some embodiments, the nematic LC molecules 512 disposed in the vicinity of (or adjacent) the upper and lower substrates 502 may be oriented in a parallel direction. The directors of the LC molecules 512 may be twisted by 180° from one substrate to the other substrate, due to the parallel alignment direction (e.g., parallel rubbing direction) on each substrate 502. As a comparison, in a TNLC cell, the alignment directions on two substrates may be perpendicular to each other. Accordingly, a 90° twist of LC directors from one substrate to the other substrate may be formed inside the TNLC cell.

When a relatively low electric field E is applied (e.g., when a relatively low voltage $V_1$ (e.g., $V_1=2V$) is applied), as shown in FIG. 5A, the Pi-cell 505 may be operated at a bend state, in which the LC molecules 512 at the middle portion of the LC layer 510 may be re-oriented by the electric field E to be perpendicular to the substrates 502, while other LC molecules 512 at the upper and lower portions of the LC layer 510 maybe oriented parallel to the alignment direction 514 due to the constraints of the surfaces of the alignment layers 506. In some embodiments, a polarization direction of a linearly polarized incident light 550 may be orientated relative to the alignment direction 514 of the Pi-cell 505, such that after propagating through the Pi-cell 505, the polarization direction of the incident light 550 may be rotated by about 90°. In some embodiments, the polarization direction of the linearly polarized incident light 550 may be configured to form an angle within a range of 35° to 55° (or −35° to −55°) with respect to the alignment direction 514 of the Pi-cell 505. In some embodiments, the polarization direction of the linearly polarized incident light 550 may be configured to form an angle of 45° (or −45°) with respect to the alignment direction 514 of the Pi-cell 505.

When a relatively high electric field E is applied (e.g., when a relatively high voltage $V_2$ (e.g., $V_2=10V$) is applied), as shown in FIG. 5B, the Pi-cell 505 may be switched to a homeotropic state, in which state the majority of the LC molecules 512 may be reoriented by the electric field E to be perpendicular to the substrates 502. After propagating through the LC layer 510, the polarization direction of the linearly polarized incident light 550 may remain substantially the same. In some embodiments, by switching the Pi-cell 505 between a relative low voltage state (e.g., a bend state) and a relative high voltage state (e.g., a homeotropic state), the polarization rotator 500 may be switched between a first switching state where the polarization of the linearly polarized incident light 550 may be maintained and a second switching state where the polarization of the linearly polarized incident light 550 may be rotated by about 90°. The switching time period may be substantially short, e.g., in the order of millisecond ("ms"). In other words, the switching frequency may be high, e.g., in the order of 1000 Hz. In some embodiments, the polarization rotator 500 may include one or more compensations films configured to achieve a broadband SHWP.

FIG. 6A illustrates a schematic diagram of a polarization rotator including ferroelectric liquid crystals ("FLCs"), according to an embodiment of the present disclosure. FIG. 6B illustrates a schematic diagram of two final states of ferroelectric liquid crystal ("FLC") molecules in the polarization rotator shown in FIG. 6A, according to an embodiment of the present disclosure. The polarization rotator may include an FLC cell 600. The FLC cell 600 may be configured with a superfast switching capability with a switching time less than 100 microsecond (μs), a broad viewing angle, and a low residual retardance due to intrinsic in-plane switching behaviors of the FLC molecules. The FLC cell 600 may include an FLC layer 605 sandwiched between two opposite substrates (not shown in FIG. 6A). Each substrate may be provided with an electrode and an alignment layer (not shown in FIG. 6A). Within the ferroelectric smectic C* phase (the symbol "*" refers to the chiral nature), FLC molecules 610 in the FLC layer 605 may be arranged in a layered geometry where the smectic layers are perpendicular to the substrates. The directors of the FLC molecules 610 may move along the surface of a cone (denoted by dashed lines in FIG. 6A). The axis of the cone (e.g. along an x-direction in FIG. 6A) may be normal to the smectic layers (e.g., in a y-z plane) and parallel to the substrates. The FLC molecules 610 may have a helical structure with spontaneous polarization (P) perpendicular to the FLC molecules 610 that are tilted with respect to the normal (e.g., along the x-direction in FIG. 6A) of the smectic layers. The tilt angle may be represented by θ shown in FIGS. 6A and 6B. In a thin cell of a surface-stabilized configuration where the thickness of the FLC layer 605 is smaller than the helix pitch, the helixes of the FLCs may be unwound, which may result in a net spontaneous polarization. Such an FLC mode may be referred to as a surface stabilized ("SSFLC") mode. In some embodiments, the thickness of the FLC layer 605 may be comparable with the helix pitch. In such a configuration, suppression of helical structure may be achieved by applying the electric field E. Such an FLC mode may be referred to as an electrically suppressed helix ("ESHFLC") mode. Other operation modes of FLCs may also be used.

When a voltage is applied to the FLC cell 600, the FLC molecules 610 may be rotated along the cone and may align themselves in a state where the spontaneous polarization P is parallel to the direction of the electric field E. In some embodiments, as shown in FIG. 6B, the directors of the FLC molecules 610 may be re-oriented from one final state 620 to another final state 630 when an external electric field E changes polarity, e.g., from +E to −E. The total angle of switching may equal to the double tilt angle θ, i.e., the total angle of switching from one final state 620 to another final state 630 when an external electric field E changes polarity may be 2θ. In each final state, the directors of the FLC molecules 610 may remain parallel to the substrates, thereby transforming the FLC cell 600 into a uniaxial phase plate. When the FLC cell 600 is used as the first polarization rotator 105 in the polarization-agnostic optical dimming device 100 shown in FIGS. 1A-4D, a transmission axis of the first polarizer 110 may be orientated to coincide with the director of FLC molecules 610 at one of the final states 620 and 630 such that the optical axis of the FLC layer 605 forms an angle 2θ with respect to the first polarizer 110. The angle 2θ may be about 45° (e.g., 45°, 46°, 47°, 44°, 43°, 42°, or any suitable predetermined small range around 45°, etc.). A high switching frequency and a high contrast polarization rotator may be obtained under applied electric fields of opposite polarities.

FIG. 7 illustrates a schematic diagram of a polarization rotator 700, according to another embodiment of the present disclosure. As shown in FIG. 7, the polarization rotator 700 may include two or more LC cells. For example, the polarization rotator 700 may include a first LC cell 710 and a second LC cell 720 arranged in series. The first LC cell 710 and the second LC cell 720 may be stacked. The number of LC cells may not be limited to two. In some embodiments, the first cell 710 and the second LC cell 720 may be filled with the same LC material and operated in the same LC mode. The LC mode may include any one of a TN mode, an electronically controllable birefringence ("ECB") mode, or an optically compensated bend ("OCB") mode (e.g., Pi-cell). In some embodiments, an unpowered transition from a high-voltage state to a low-voltage state or a voltage-off state of an LC cell may take a relatively longer response time, as the response time of the LC cell may depend on elastic forces propagating from the fixed boundary. A powered transition from a voltage-off state or a low-voltage state to a high-voltage state may take a relatively shorter response time due to an electric field coupling with the induced dipole moments of LCs and creating torque.

To improve the unpowered transition, the first LC cell 710 and second LC cell 720 may be arranged such that the corresponding alignment directions (e.g., rubbing directions) of the first LC cell 710 and the second LC cell 720 may be orthogonal to each other. For example, when the first LC cell 710 and second LC cell 720 are operated in the OCB mode, the alignment direction of the first LC cell 710 may be in the y-direction, and the alignment direction of the second LC cell 720 may be in the x-direction. When the first LC cell 710 and second LC cell 720 are operated in the TN mode, the alignment directions at lower and upper substrates of the first LC cell 710 shown in FIG. 7 may be in the x-direction and the y-direction, respectively. The alignment directions at the lower and upper sub states of the second LC cell 720 may be in the y-direction and the x-direction, respectively.

The operations of the two LC cells 710 and 720 during two consecutive time periods will be described below. Initially, the first LC cell 710 may be at a high-voltage state and the second LC cell 720 may be at a voltage-off state or a low-voltage state. During a first time period, the first LC cell 710 may undergo a slow transition from the high-voltage state to the voltage-off state or the low-voltage state. The second LC cell 720 may first undergo a fast transition from the voltage-off state or the low-voltage state to the high-voltage state, and then undergo a slow transition from the high-voltage state to the voltage-off state or the low-voltage state. The optical effect of the slow transitions of the two LC cells 710 and 720 in the first time period may not be perceivable to the user, as the polarization state of an output light from the polarization rotator 700 may remain the same as that of an incoming light. During a second time period, the first LC cell 710 may undergo a fast transition from the voltage-off state or the low-voltage state to the high-voltage state, and the second LC cell 720 may remain at the voltage-off state or the low-voltage state. In some embodiments, the polarization state of an output light from the polarization rotator 700 may be rotated by about 90 degrees relative to that of the incoming light. The switching frequency of the polarization rotator 700 may be sufficiently high for applications where a switching frequency of 400 Hz or more is desirable.

Figure 8:
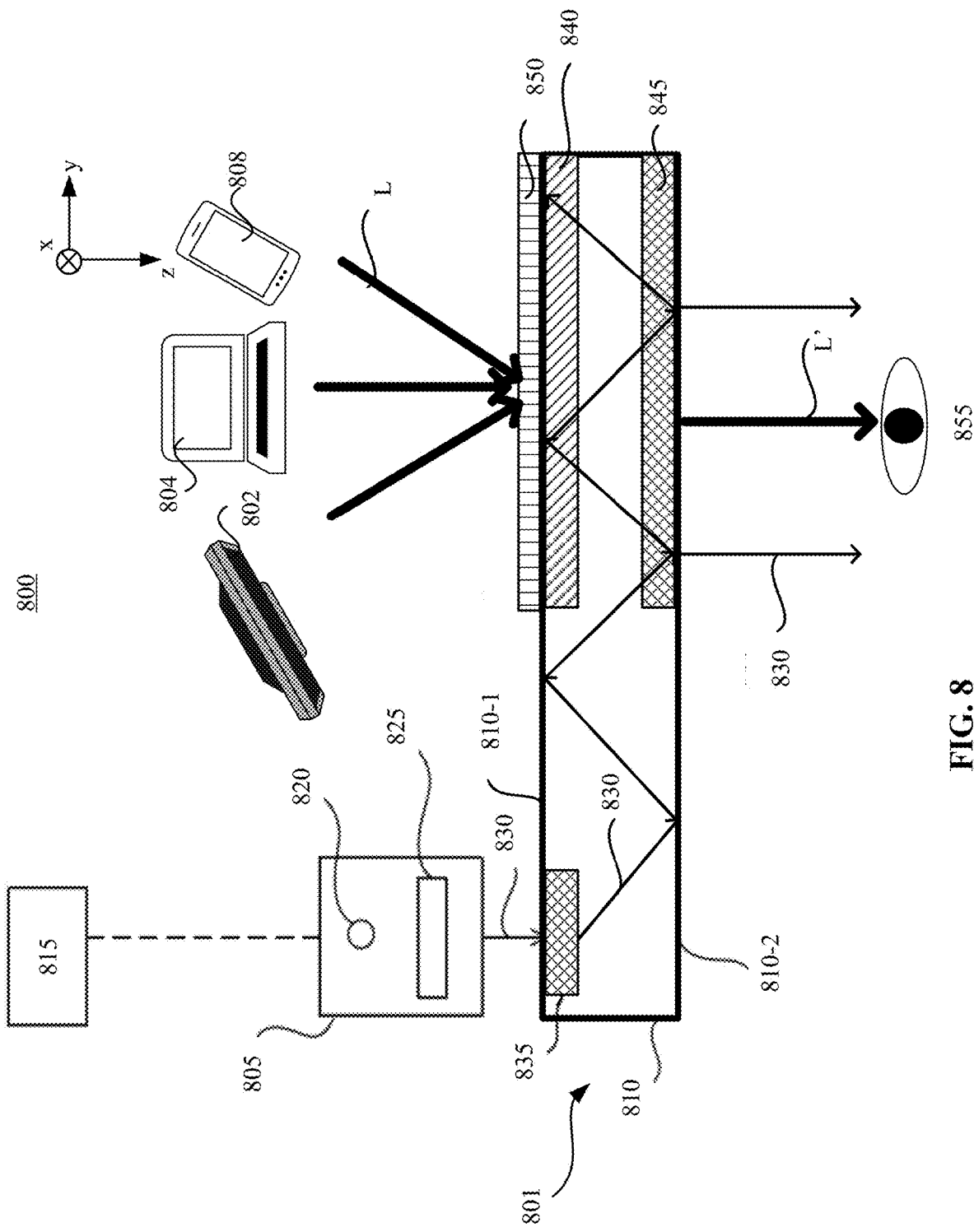
FIG. 8 illustrates a schematic diagram of an optical system, according to an embodiment of the present disclosure.

FIG. 8 illustrates a schematic diagram of an optical system 800. The optical system 800 may be included in an NED. The optical system 800 may include an optical combiner 801, a light source assembly 805, and a controller 815. The optical combiner 801 may be an embodiment of the optical combiner 150 shown in FIGS. 2A-2C or the optical combiner 450 shown in FIGS. 4A-4D. As shown in FIG. 8, the optical combiner 801 may include a waveguide 810 configured to redirect an image light 830 received from the light source assembly 805 to an eye 855 of a user. The light source assembly 805 and the waveguide 810 may form a display assembly, e.g., a waveguide display system, which may be a component of an NED. The waveguide display system may include additional elements not shown in FIG. 8, or may omit certain elements shown in FIG. 8, depending on the applications.

The light source assembly 805 may include a light source 820 and an optical device 825. The light source 820 may include any suitable light source, e.g., a laser diode, a vertical cavity surface emitting laser, a light emitting diode, or a combination thereof. In some embodiments, the light source 820 may include a display panel, such as a liquid crystal display ("LCD") panel, an liquid-crystal-on-silicon ("LCoS") display panel, an organic light-emitting diode ("OLED") display panel, a micro light-emitting diode ("micro-LED") display panel, a digital light processing ("DLP") display panel, or a combination thereof. In some embodiments, the light source 820 may include a self-emissive panel, such as an OLED display panel, a micro-LED display panel, or a combination thereof. In some embodiments, the light source 820 may include a display panel that may be illuminated by an external source, such as an LCD panel, an LCoS display panel, a DLP display panel, or a combination thereof. Examples of an external source may include a laser, an LED, an OLED, or a combination thereof.

The optical device 825 may include one or more optical components configured to condition the light from the light source 820. Conditioning the light from the light source 820 may include, for example, at least one of transmitting the light, attenuating the light, expanding the light, collimating the light, or adjusting an orientation of the light, in accordance with instructions from the controller 815.

The light source assembly 805 may generate the image light 830 (which may be referred to as an internal image light to distinguish from an ambient image light from an ambient electronic screen in the real world environment) and output the image light 830 to an in-coupling element 835 disposed at a first end portion of the waveguide 810. In some embodiments, the waveguide 810 may expand, guide, direct, or transmit the image light 830 to the eye 855 of the user. The waveguide 810 may receive the image light 830 at one or more in-coupling elements 835 disposed at the first end portion of the waveguide 810, and guide the received image light 830 to an out-coupling element 845 disposed at a second end portion of the waveguide 810. The out-coupling element 845 may decouple the image light 830 out of the waveguide 810 toward the eye 855.

In some embodiments, the in-coupling element 835 may be configured to couple the image light 830 from the light source assembly 805 into the waveguide 810. The waveguide 810 may include a first surface (or side) 810-1 facing the real world environment and an opposing second surface (or side) 810-2 facing the eye 855. The in-coupling element 835 may be a part of, or affixed to, the first surface 810-1 or the second surface 810-2 of the waveguide 810. In some embodiments, as shown in FIG. 8, the in-coupling element 835 may be a part of, or affixed to, the first surface 810-1 of the waveguide 810. In some embodiments, the in-coupling element 835 may be a part of, or affixed to, the second surface 810-2 of the waveguide 810. The in-coupling element 835 may include, for example, a surface relief grating, a volume hologram, a polarization grating, a polarization volume hologram, a metasurface grating, other suitable types of diffractive elements, or a combination thereof. In some embodiments, the in-coupling element 835 may include a diffraction grating. A pitch of the diffraction grating may be configured to enable total internal reflection of the image light 830 within the waveguide 810. Accordingly, the image light 830 may propagate internally within the waveguide 810 via total internal reflection from the in-coupling element 835 to the out-coupling element 845. In some embodiments, the in-coupling element 835 may also be referred to as an in-coupling grating.

The out-coupling element 845 may be a part of, or affixed to, the first surface 810-1 or the second surface 810-2 of the waveguide 810. In some embodiments, as shown in FIG. 8, the out-coupling element 845 may be a part of, or affixed to, the second surface 810-2 of the waveguide 810. In some embodiments, the out-coupling element 845 may be a part of, or affixed to, the first surface 810-1 of the waveguide 810. In some embodiments, the out-coupling element 845 may include a surface relief grating, a volume hologram, a polarization grating, a polarization volume hologram, a metasurface grating, other suitable types of diffractive elements, or a combination thereof. In some embodiments, the out-coupling element 845 may include a diffraction grating. A pitch of the diffraction grating may be configured to enable the out-coupling element 845 to decouple the image light 830 out of the waveguide 810. In some embodiments, the out-coupling element 845 may be referred to as an out-coupling grating.

In some embodiments, the optical combiner 801 may include additional gratings configured to redirect, fold, and/or expand the pupil of the light source assembly 805. In some embodiments, the light source assembly 805 may include a projector. In some embodiments, the optical combiner 801 may include a directing element 840 configured to redirect the image light 830 to the out-coupling element 845. The directing element 840 may be disposed at the second end portion of the waveguide 810. For example, the directing element 840 may be a part of, or affixed to, the first surface 810-1 of the waveguide 810, facing the out-coupling element 845 disposed at the second surface 810-2. In some embodiments, the directing element 840 and the out-coupling element 845 may have a similar structure. The directing element 840 may include, for example, a surface relief grating, a volume hologram, a polarization grating, a polarization volume hologram, a metasurface grating, other suitable types of diffractive elements, or a combination thereof. In some embodiments, the directing element 840 may be a diffraction grating. The pitch of the diffraction grating may be configured to enable the directing element 840 to direct the image light 830 toward a surface of the out-coupling element 845 at a predetermined incident angle. In some embodiments, the directing element 840 may be referred to as a folding grating. In some embodiments, multiple functions, e.g., redirecting, folding, and/or expanding the pupil of the optical combiner 801 may be combined into a single grating, e.g. an out-coupling grating. In some embodiments, the above-mentioned gratings may be divided in a plurality of sections (or subgratings) to provide other functions, such as for tiling the field of view ("FOV").

The waveguide 810 may include one or more materials configured to facilitate the total internal reflection of the image light 830. The waveguide 810 may include, for example, a plastic, a glass, a polymer, or a combination thereof. In some embodiments, the waveguide 810 may have a small form factor. The controller 815 may be communicatively coupled with the light source assembly 805 and configured to control the operation of the light source assembly 805. In some embodiments, the waveguide 810 may output the expanded image light 830 to the eye 855 with an increased (or expanded) FOV. For example, the expanded image light 830 may be provided to the eye 855 with a diagonal FOV (in x and y directions) of 80 degrees or greater and 150 degrees or less. The waveguide 810 may be configured to provide an eye-box with a width that is greater than or equal to 8 mm and equal to or less than 50 mm, and a height that is greater than or equal to 8 mm and equal to or less than 80 mm.

In some embodiments, the waveguide display system may include a plurality of light source assemblies 805 and a plurality of waveguides 810. Each of the light source assemblies 805 may be configured to emit a monochromatic image light of a specific wavelength or a specific wavelength band corresponding to a primary color (e.g., red, green, or blue). The plurality of waveguides 810 may be stacked together to output an expanded multi-colored image light 830. In some embodiments, the plurality of waveguides 810 may be separated by air gaps. In some embodiments, the plurality of waveguides 810 may be separated by a low refractive index material, such as a nanoporous film. In some embodiments, the waveguide display system may include a stack of waveguides 810. Each waveguide 810 may be configured to provide a portion of the total field of view and/or a portion of a desirable color spectrum of the virtual image. With the disclosed waveguide display system, physical displays and electronics may be moved to a side of a front rigid body of an NED. As a result, a substantially unobstructed view of the real world environment may be provided to a user of the NED, therefore enhancing the AR user experience.

Referring back to FIG. 8, the optical system 800 may include a polarization-agnostic optical dimming device 850. The polarization-agnostic optical dimming device 850 may be a part of, or affixed to, the first surface 810-1 of the waveguide 810. The polarization-agnostic optical dimming device 850 may be an embodiment of the polarization-agnostic optical dimming device 100 shown in FIGS. 1A-4D. The polarization-agnostic optical dimming device 850 may be configured to dim incoming lights L from the real world environment (e.g., ambient image lights emitted from a TV screen 802, a laptop screen 804, or a cell phone screen 808 in different initial polarizations). In some embodiments, in the clear state or the intermediate state for AR and/or MR applications, the polarization-agnostic optical dimming device 850 may dim the incoming lights L from the real world environment to a substantially same predetermined percentage of a corresponding initial intensity of the respective incoming lights L regardless (e.g., independent) of the initial polarizations of the incoming lights L.

In some embodiments, when the polarization-agnostic optical dimming device 850 is an embodiment of the polarization-agnostic optical dimming device 100, the first and second polarization rotators 105 and 115 and the first and second polarizers 110 and 120 included in the polarization-agnostic optical dimming device 850 may not attenuate (e.g., absorb and/or reflect) the optical power of the lights L. The polarization-agnostic optical dimming device 850 may dim the incoming lights L from the real world environment to about half (50%) of an initial intensity of the respective incoming lights L regardless (e.g., independent) of the initial polarizations of the incoming lights L. In other words, the intensity of the lights L' output by the polarization-agnostic optical dimming device 850 (which may be further output by the optical combiner 800) may be reduced to a predetermined percentage (e.g., 50%) of the initial intensity of the light L regardless (e.g., independent) of the initial polarization of the light L.

In some embodiments, the first and second polarization rotators 105 and 115 and the first and second polarizers 110 and 120 included in the polarization-agnostic optical dimming device 850 may attenuate (e.g., absorb, reflect, and/or scatter) a portion of the optical power of the lights L. Accordingly, the light intensity of the light L' may be less than 50% of the initial intensity of the incoming light L from the real world environment. For example, the light intensity of the light L' may be about 20% to about 49% of the initial intensity of the incoming light L from the real world environment. For different incoming lights L having different initial polarizations, the polarization-agnostic optical dimming device 850 may reduce the light intensity to a same predetermined percentage (e.g., any suitable percentage within the range of 20%-50%) of the initial intensity of the incoming lights L, independent of the initial polarizations of the incoming lights L. With the reduced light intensity, the user of the NED (which may include the optical system 800) may still be able to perceive bright and clear images displayed on the various ambient electronic screens that emit the image lights (ambient image lights) in different initial polarizations. The user may view the various ambient electronic screens without taking off the NED. That is, when the user wearing the NED looks at different ambient electronic screens that emit image lights (ambient image lights) in different initial polarizations and when the polarization-agnostic optical dimming device 850 is at the clear state, the ambient electronic screens may not visually appear dark (e.g., that images are not perceivable or difficult to perceive) to the user. In other words, when the polarization-agnostic optical dimming device 850 is at the clear state, images displayed on the ambient electronic screens may be readily perceivable by the user regardless (e.g., independent) of the polarization of the image lights emitted from respective ambient electronic screens. Accordingly, the operation of the NED may be significantly simplified, and the user experience of the NED may be significantly improved. In some embodiments, the polarization-agnostic optical dimming device 850 may be switched to a dark state for VR applications. In some embodiments, the polarization-agnostic optical dimming device 850 may be switched to an intermediate state, thereby mitigating the difference in the brightness of real world and virtual scenes for the AR/MR applications.

Figure 9:
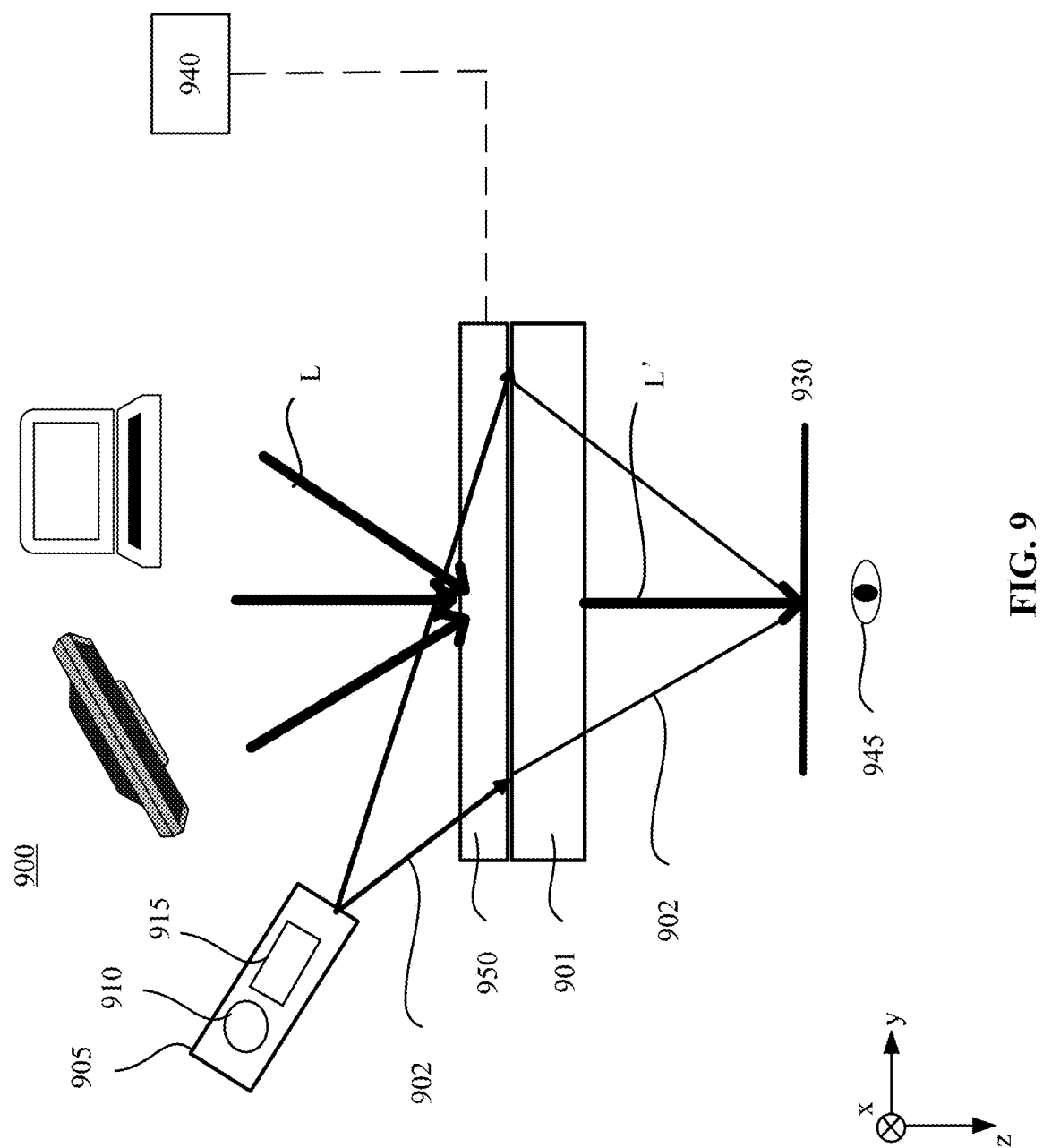
FIG. 9 illustrates a schematic diagram of an optical system, according to another embodiment of the present disclosure.

FIG. 9 illustrates a schematic diagram of an optical system 900, according to an embodiment of the present disclosure. The optical system 900 may be included in an NED. The optical system 900 may include an optical combiner 901, a projector 905, a controller 940, and a polarization-agnostic optical dimming device 950. The optical combiner 901 may be an embodiment of the optical combiner 150 shown in FIGS. 2A-2C or the optical combiner 450 shown in FIGS. 4A-4D. As shown in FIG. 9, the optical combiner 901 may include an image combiner configured to focus an image light 902 received from the projector 905 onto one or more light spots at a surface where an exit pupil of the NED is located. An exit pupil may be a location where an eye pupil 945 of a user is positioned at an eye-box 930 region when the user wears or uses the NED. In other words, the image combiner 901 may focus the image light received from the projector 905 onto one or more exit pupils of the NED at the eye-box 930 region. The projector 905 and the image combiner 901 may form a display system, which may be a component of the NED. The display system may include other elements not shown in FIG. 9.

In some embodiments, the image combiner 901 may include a holographic optical element ("HOE") (hence, the image combiner 900 may be referred to as an HOE image combiner). In some embodiments, the HOE may include a wide field of view ("FOV"). The HOE may include a fixed hologram configured to focus a highly off-axis light beam as an on-axis light beam in front of the eye pupil 945. In some embodiments, the HOE may include a volume (or Bragg) hologram, which may include multiple holograms superimposed to provide a high diffraction efficiency at a plurality of wavelengths (e.g., red, green, and blue wavelengths), thereby enabling a full color display. In some embodiments, the HOE may include a volume hologram or a Bragg hologram, which may include multiple holograms superimposed to achieve an increased angular spectrum of the HOE. The projector 905 may include a light source 910 and an optical device 915.

The light source 910 may be configured to generate a coherent or at least partially coherent light. The light source 910 and the optical device 915 may include elements similar to those included in the light source 820 and the optical device 825 shown in FIG. 8. Descriptions of the light source 910 and the optical device 915 may refer to the descriptions of the light source 820 and the optical device 825. The optical combiner 901 may include a first surface (or side) facing the real world environment and an opposing second surface (or side) facing the eye pupil 945. The polarization-agnostic optical dimming device 950 may be disposed at the first surface of the optical combiner 901. The controller 940 may be communicatively coupled with the polarization-agnostic optical dimming device 950. The polarization-agnostic optical dimming device 950 may be similar to the polarization-agnostic optical dimming device 850 shown in FIG. 8. When used for AR or MR applications, a light L from the real world environment may be dimmed by the polarization-agnostic optical dimming device 950. The dimmed light may be output by the polarization-agnostic optical dimming device 950 as a light L'. The optical combiner 901 may combine the image light 902 received from the projector 905, and the dimmed light L' originated from the real world environment and output by the polarization-agnostic optical dimming device 950. The optical combiner 901 may output a combined light toward the eye-box 930 of the NED. FIG. 8 and FIG. 9 illustrate exemplary display systems that may be coupled with a disclosed polarization-agnostic optical dimming device. Other display systems having different configurations may also be used in combination with the disclosed polarization-agnostic optical dimming device.

Figure 10:
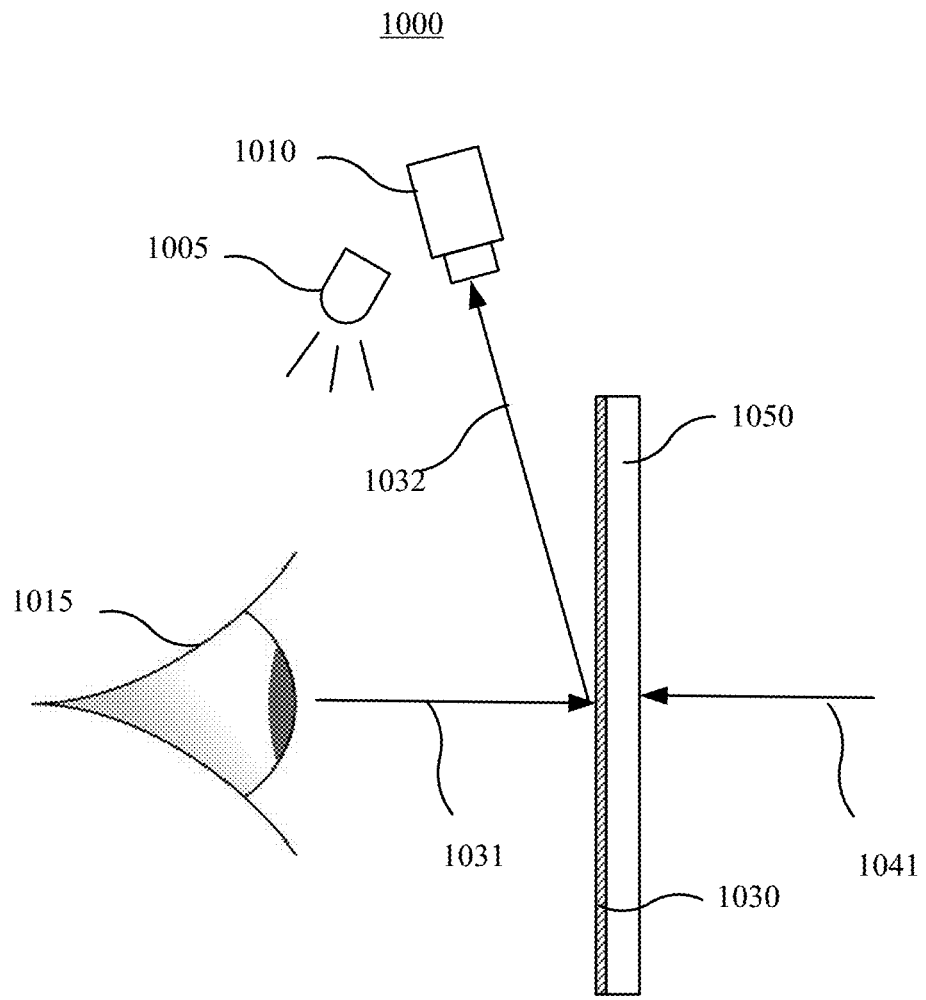
FIG. 10 illustrates a schematic diagram of an eye-tracking system, according to an embodiment of the present disclosure.

In some embodiments, a polarization-agnostic optical dimming device may be used with an eye-tracking combiner. FIG. 10 illustrates a schematic diagram of an eye-tracking system 1000 including a polarization-agnostic optical dimming device 1050, according to an embodiment of the present disclosure. The polarization-agnostic optical dimming device 1050 may be an embodiment of the polarization-agnostic optical dimming device 100, the polarization-agnostic optical dimming device 850, or the polarization-agnostic optical dimming device 950. As shown in FIG. 10, a light source 1005 may emit an infrared ("IR") light to illuminate one or two eyes 1015 of a user of the NED. The IR light is not visible to the human eyes and thus, may not distract the user of the NED during operation. An optical sensor 1010, such as a camera, may be disposed near the eye 1015. The optical sensor 1010 may be configured to receive an IR light reflected by the eye 1015 and generate an image of the eye 1015 based on the received IR light. The image of the eye 1015 may be processed to extract information (e.g., a gaze direction, a movement direction, a psychological state, etc.) of the eye 1015. As shown in FIG. 10, an eye-tracking combiner 1030 may be disposed facing the eye 1015 and the optical sensor 1010. An IR light 1031 reflected by the eye 1015 may be redirected by the eye-tracking combiner 1030 as an IR light 1032 toward the optical sensor 1010. The polarization-agnostic optical dimming device 1050 may be disposed at a side of the eye-tracking combiner 1030 facing the real world environment. The polarization-agnostic optical dimming device 1050 may dim an incoming light 1041 from the real world environment to a substantially same predetermined percentage of an initial intensity of the incoming light 1041 regardless (e.g., independent) of the initial polarization of the incoming light 1041.

In some embodiments, the light emitted by the light source 1005 may include a relatively narrow spectrum or a relatively broad spectrum. In some embodiments, one or more wavelengths of the light may be in the IR spectrum. For example, in some embodiments, the spectrum of the light source 1005 may be within, overlap, or encompass the IR spectrum. In some embodiments, the light source 1005 may emit lights in the near infrared ("NIR") band (about 750 nm to about 1050 nm), or some other portion of the electromagnetic spectrum. The IR light may be reflected by a pupil area of the eye 1015. In some embodiments, the IR light may be reflected by the entire eye 1015. In some embodiments, the IR light may be reflected by a body portion of the user adjacent the eye 1015, such as a skin located above, below, to the left of, or to the right of the eye 1015. In some embodiments, the IR light may be reflected by an area of a body portion including the eye 1015 and skins surrounding the eye 1015.

The optical sensor 1010 may be sensible to a light having a wavelength within a spectrum that includes IR spectrum. In some embodiments, the optical sensor 1010 may be sensitive to an IR light and may not be sensible to a visible light. In some embodiments, the optical sensor 1010 may include a charge-coupled device ("CCD") camera, a complementary metal-oxide-semiconductor ("CMOS") sensor, an N-type metal-oxide-semiconductor ("NMOS") sensor, a pixelated camera, other suitable camera, or a combination thereof. In some embodiments, the optical sensor 1010 may include a processor configured to process the infrared light.

The processor may generate an image of the eye 1015. The processor may analyze the image of the eye 1015 to obtain information for eye-tracking and other subsequent operations. For example, the information may be used, e.g., by the processor or another suitable device, to determine what information to present to the user or the layout of the presentation of the information, etc. In some embodiments, the optical sensor 1010 may include a non-transitory computer-readable storage medium (e.g., a computer-readable memory) configured to store data or information, such as the generated images. In some embodiments, the non-transitory computer-readable storage medium may store codes or instructions executable by the processor to perform various steps of a method disclosed herein. In some embodiments, the processor and the non-transitory computer-readable medium may be separately provided from the optical sensor 1010. For example, the eye-tracking system 1000 may include a controller communicatively coupled with the optical sensor 1010 and configured to receive data from the optical sensor 1010. The controller may be configured to analyze the data (e.g., images of the eye 1015) received from the optical sensor 1010 to obtain information for eye-tracking or other purposes. In some embodiments, an optical system may include both an image combiner and an eye-tracking combiner, where one of the image combiner and eye-tracking combiner may be disposed further away from the eye than the other combiner. In some embodiment, the polarization-agnostic optical dimming device may be disposed at a side of a combiner facing the real world environment, i.e., the combiner that is disposed furthest away from the eye among the combiners (e.g., the outmost combiner).

Figure 11A:
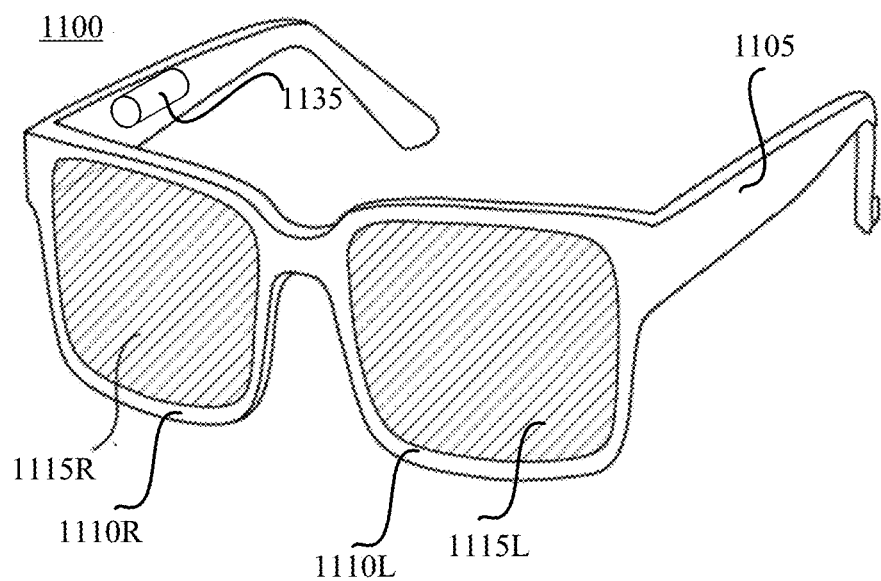
FIG. 11A illustrates a perspective view of a near-eye display ("NED"), according to an embodiment of the present disclosure.

FIG. 11A illustrates a schematic diagram of an NED 1100 according to an embodiment of the present disclosure. As shown in FIG. 11A, the NED 1100 may include a frame 1105 configured to be worn by a user. The NED 1100 may include a left-eye display system 1110L and a right-eye display system 1110R, which are mounted to the frame 1105. Each of the left-eye display system 1110L and the right-eye display system 1110R may include one or more image display components configured to project computer-generated virtual images onto a left display window 1115L and a right display window 1115R in the user's FOV. An example of the left-eye display system 1110L and the right-eye display system 1110R may include the display system described above in connection with FIG. 8 or FIG. 9. For illustrative purposes, FIG. 11A shows that the display system may include a light source assembly 1135 coupled to (e.g., mounted on) the frame 1105. The NED 1100 may function as a VR device, an AR device, an MR device, or a combination thereof. In some embodiments, when the NED 1100 functions as an AR and/or an MR device, the right display window 1115R and the left display window 1115L may be fully or at least partially transparent from the perspective of the user, thereby enabling the user to view a surrounding real world environment. In some embodiments, when the NED 1100 functions as a VR device, the right display window 1115R and the left display window 1115L may be opaque. As a result, the user may be immersed in the VR imagery provided by the NED.

Figure 11B:
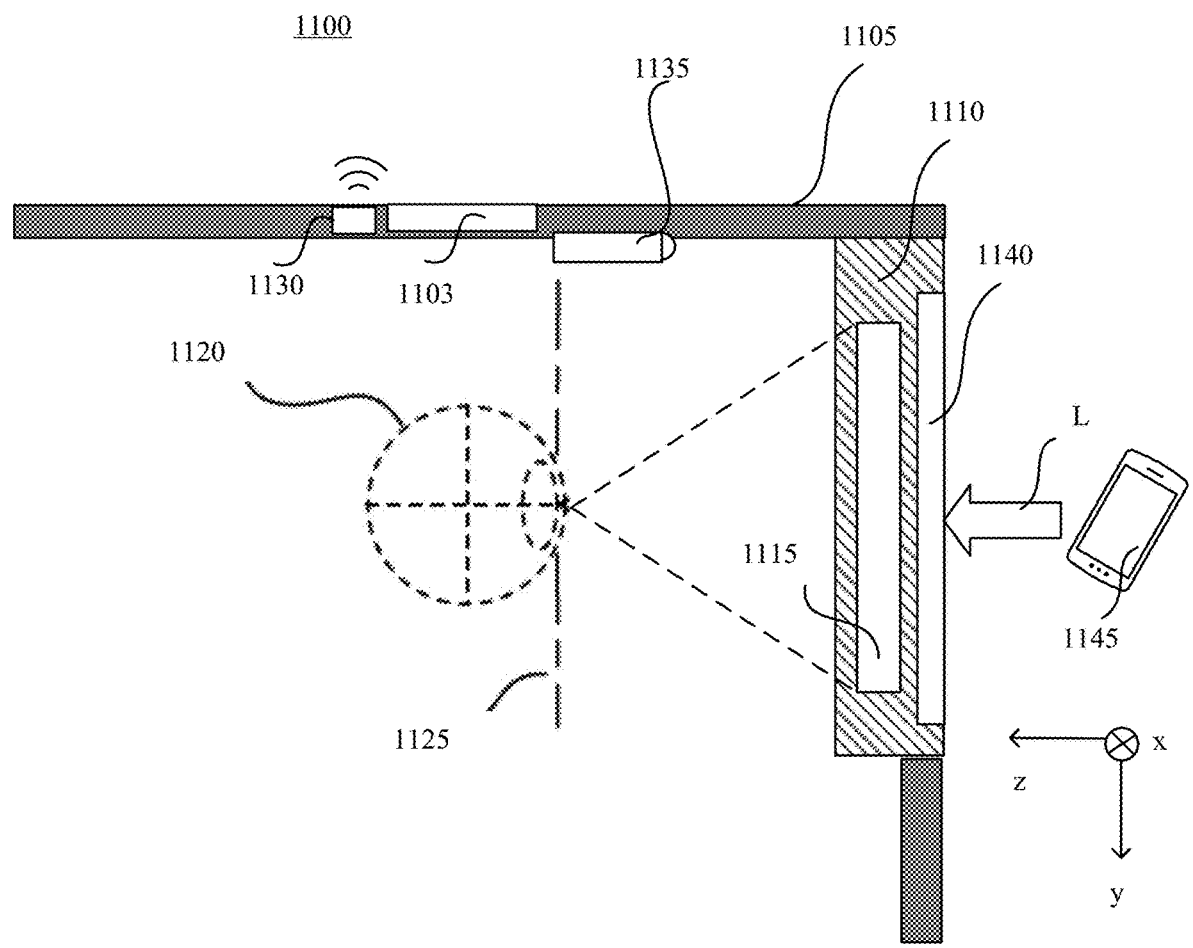
FIG. 11B illustrates a schematic diagram of a cross sectional view of the NED of FIG. 11A, according to an embodiment of the present disclosure.

FIG. 11B is a cross sectional view of the NED 1100 shown in FIG. 11A, according to an embodiment of the present disclosure. As shown in FIG. 11B, a display system 1110 (which may represent the right-eye display system 1110R or the left-eye display systems 1110L) may include an optical combiner 1115. In some embodiments, the display system 1110 may also include the light source assembly 1135 as a component. In some embodiments, the NED 1100 may include a lens block (not shown in FIG. 11B). The display system 1110 and the lens block together may provide an image light to an exit pupil 1125. The exit pupil 1125 may be a location where an eye 1120 of the user is positioned. For illustrative purposes, FIG. 11B shows a cross sectional view associated with a single eye 1120. A similar display system, separate from the display system 1110, may be included in the other half of the NED 1100 (that is not shown) to direct the image light to another eye of the user.

In some embodiments, the NED 1100 may include a polarization-agnostic optical dimming device 1140 disposed at a side of the optical combiner 1115 facing the real world environment. The polarization-agnostic optical dimming device 1140 may be disposed between the optical combiner 1115 and an input aperture through which ambient light enters the NED 1100. The input aperture may be defined by an opening in a housing, or a frame (e.g., an eye frame in a pair of glasses or goggles, a light-transmissive window, or otherwise defined). The polarization-agnostic optical dimming device 1140 may be an embodiment of the polarization-agnostic optical dimming device 100, the polarization-agnostic optical dimming device 850, or the polarization-agnostic optical dimming device 950. The polarization-agnostic optical dimming device 1140 may be configured to dim an incoming light L from the real world environment (e.g., emitted by a display screen 1145, such as a cell phone screen, a TV screen, a laptop screen, etc., present in the ambient environment) to a substantially same predetermined percentage of an initial intensity of the incoming light regardless (e.g., independent) of the initial polarization of the incoming light L. In some embodiments, the NED 1100 may include an eye-tracking device (not shown in FIG. 11B) configured to determine eye-tracking information for tracking the eye 1120.

In some embodiments, the NED 1100 may include a processor 1103 configured to execute one or more computer programs, computer instructions, or codes to effectuate various controls or processes, such as the generation of the image light. In some embodiments, the processor 1103 may include at least one of the dimming controller 140, the controller 815, or the controller 940. In some embodiments, the processor 1103 may be included in at least one of the dimming controller 140, the controller 815, or the controller 940. A non-transitory computer readable medium (not shown in FIG. 11B) may be configured to store or encode thereon software instructions or codes that, when executed by the processor 1103, may cause the processor 1103 to generate control signals for controlling or performing various methods, processes, or operations disclosed herein. The software instructions or codes may be pre-stored in the NED 1100, or may be transmitted to the NED 1100 via a wireless transmitter 1130 from another computer or device through a suitable network, such as WiFi or a cellular network. In some embodiments, the NED 1100 may include an interface for physically connecting the NED 1100 with another computer or device to receive the software instructions or codes.

Figure 12:
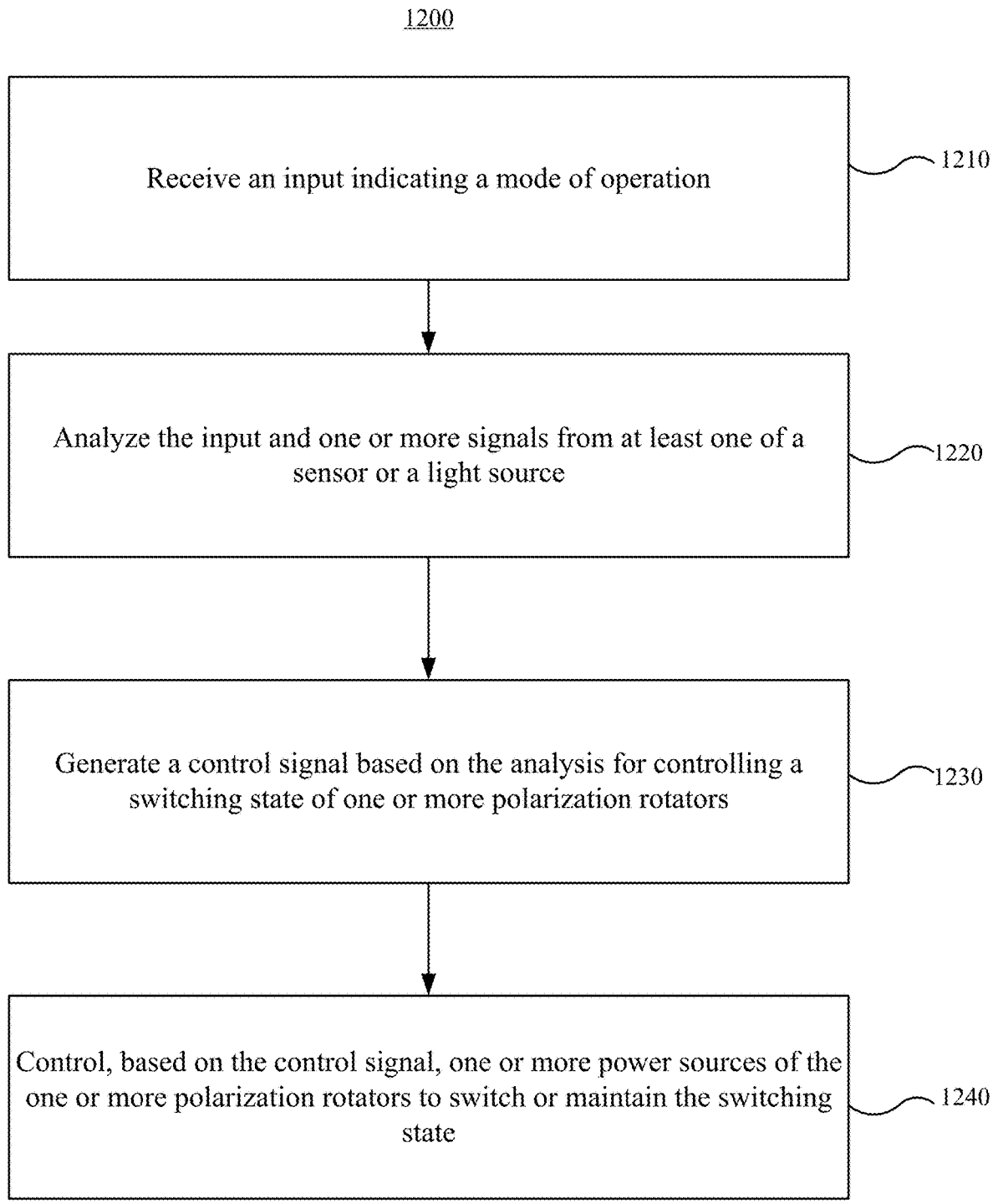
FIG. 12 illustrates a flow chart of a process performed by an optical assembly including an optical dimming device, according to an embodiment of the present disclosure.

In some embodiments, the present disclosure provides a method relating to the operations performed by the NED, including the polarization-agnostic optical dimming device, to provide polarization-agnostic dimming or blocking of an incoming light. FIG. 12 is a flow chart illustrating a method or process 1200 relating to operations of an optical system or assembly including a polarization-agnostic optical dimming device, according to an embodiment of the present disclosure. In some embodiments, the method 1200 may be performed or executed by at least one of the processor 1103, the dimming controller 140, the controller 815, or the controller 940. As shown in FIG. 12, the method 1200 may include receiving an input indicating a mode of operation (step 1210). For example, the input may be received from a user or from a device. The mode of operation may include at least one of a dimmer mode for an AR or MR application, or a shutter mode for a VR application. In some embodiments, a controller or processor included in the NED may receive an input from a user or a device indicating a mode of operation selected by the user, such as a dimmer mode for AR and/or MR applications, or a shutter mode for VR applications. The method 1200 may include analyzing the input and one or more signals from at least one of a sensor or a light source (step 1220). For example, the processor 1103 may analyze the input received from the user or a device indicating the mode of operation. The processor 1103 may also analyze one or more signals received from a sensor and/or a light source. For example, based on the one or more signals, the processor 1103 may analyze the current configuration of the optical assembly 200 or 400. The method 1200 may include generating a control signal based on the analysis for controlling a switching state of one or more polarization rotators (step 1230). The method 1200 may also include controlling, based on the control signal, one or more power sources of the one or more polarization rotators to switch or maintain the switching state (step 1240). The method 1200 may include additional steps not shown in FIG. 12, such as those described above in connection with other figures.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems referred to in the specification may include a single processor or may be architectures employing multiple processors for increased computing capability. The processor may be a central processing unit ("CPU"), a graphics processing unit ("GPU"). The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical dimming device, comprising:
    at least one polarization rotator configured to switch a polarization of a linearly polarized component of an incoming light between two orthogonal polarizations; and
    at least one polarizer coupled with the at least one polarization rotator, and configured to output a light having a light intensity reduced to a predetermined percentage of an initial light intensity of the incoming light,
    wherein the predetermined percentage is substantially the same for different incoming lights having different initial polarizations.

2. The optical dimming device of claim 1, wherein at a clear state or an intermediate state of the optical dimming device, the at least one polarization rotator is configured to constantly switch the linearly polarized component of the incoming light between the two orthogonal polarizations at a predetermined switching frequency.

3. The optical dimming device of claim 2, wherein the predetermined switching frequency is at least 60 Hz.

4. The optical dimming device of claim 1, wherein the at least one polarization rotator includes a switchable half-wave plate.

5. The optical dimming device of claim 1, wherein the at least one polarization rotator includes at least one of a Pi-cell, a ferroelectric liquid crystal, a twisted-nematic cell, or an electrically controlled birefringence cell.

6. The optical dimming device of claim 1, wherein the at least one polarization rotator includes two or more liquid crystal ("LC") cells stacked in series, wherein the two or more LC cells are arranged with orthogonal alignment directions.

7. The optical dimming device of claim 6, wherein the two or more LC cells are filled with a same material and operated in a same LC mode.

8. The optical dimming device of claim 7, wherein the LC mode includes one of a twisted-nematic mode, an electronically controllable birefringence mode, or an optically compensated bend mode.

9. The optical dimming device of claim 1, wherein:
    the at least one polarization rotator includes a first polarization rotator and a second polarization rotator, and the at least one polarizer includes a first polarizer and a second polarizer,
    the first polarization rotator is configured to switch the linearly polarized component of the incoming light between a first polarization and a second polarization that is orthogonal to the first polarization at a predetermined switching frequency,
    the first polarizer is disposed between the first polarization rotator and the second polarization rotator, and is configured to transmit a linearly polarized light having a third polarization and block a linearly polarized light having a polarization orthogonal to the third polarization, the second polarization rotator is disposed between the first polarizer and the second polarizer, and is configured to switch the linearly polarized light having the third polarization between a fourth polarization and a fifth polarization that is orthogonal to the fourth polarization, and the second polarizer is configured to transmit one of a linearly polarized light having the fourth polarization or a linearly polarized light having the fifth polarization and block the other one of the linearly polarized light having the fourth polarization or the linearly polarized light having the fifth polarization.

10. The optical dimming device of claim 9, wherein the second polarization rotator is configured to switch a polarization of the linearly polarized light having the third polarization to a sixth polarization different from the fourth polarization and the fifth polarization, and the second polarizer is configured to at least partially transmit a linearly polarized light having the sixth polarization.

11. An optical assembly, comprising:
    an optical combiner including a first side facing a real world environment and an opposing second side facing an eye-box of the optical assembly; and
    an optical dimming device disposed at the first side of the optical combiner and including:
        at least one polarization rotator configured to switch a polarization of a linearly polarized component of a first light from a real world environment between two orthogonal polarizations; and
        at least one polarizer coupled with the at least one polarization rotator, and configured to output a second light having a light intensity reduced to a predetermined percentage of an initial light intensity of the first light,
        wherein the predetermined percentage is substantially the same for different first lights having different initial polarizations, and
    wherein the optical combiner is configured to combine a third light from a light source and the second light to the eye-box.

12. The optical assembly of claim 11, wherein the optical combiner includes an image combiner.

13. The optical assembly of claim 11, wherein the optical combiner includes an eye-tracking combiner.

14. The optical assembly of claim 11, wherein at a clear state or an intermediate state of the optical dimming device, the at least one polarization rotator is configured to constantly switch the polarization of the linearly polarized component of the first light between the two orthogonal polarizations at a predetermined switching frequency.

15. The optical assembly of claim 14, wherein the predetermined switching frequency is at least 60 Hz.

16. The optical assembly of claim 11, wherein the at least one polarization rotator includes a switchable half-wave plate.

17. The optical assembly of claim 11, wherein the at least one polarization rotator includes at least one of a Pi-cell, a ferroelectric liquid crystal, a twisted-nematic cell, or an electrically controlled birefringence cell.

18. The optical assembly of claim 11, wherein:
    the at least one polarization rotator includes two or more liquid crystal ("LC") cells stacked in series,
    the two or more LC cells are arranged with orthogonal alignment directions,
    the two LC cells are filled with a same material and operated in a same LC mode, and
    the same LC mode includes one of a twisted-nematic mode, an electronically controllable birefringence mode, or an optically compensated bend mode.

19. The optical assembly of claim 11, wherein:
    the at least one polarization rotator includes a first polarization rotator and a second polarization rotator, and the at least one polarizer includes a first polarizer and a second polarizer,
    the first polarization rotator is configured to switch the polarization of the linearly polarized component of the first light between a first polarization and a second polarization that is orthogonal to the first polarization at a predetermined switching frequency,
    the first polarizer is disposed between the first polarization rotator and the second polarization rotator, and is configured to transmit a linearly polarized light having a third polarization and block a linearly polarized light having a polarization orthogonal to the third polarization,
    the second polarization rotator is disposed between the first polarizer and the second polarizer, and is configured to switch a polarization of the linearly polarized light having the third polarization between a fourth polarization and a fifth polarization that is orthogonal to the fourth polarization, and
    the second polarizer is configured to transmit one of a linearly polarized light having the fourth polarization or a linearly polarized light having the fifth polarization and block the other one of the linearly polarized light having the fourth polarization or the linearly polarized light having the fifth polarization.

20. The optical assembly of claim 19, wherein the second polarization rotator is configured to switch the polarization of the linearly polarized light having the third polarization to a sixth polarization different from the fourth polarization or the fifth polarization, and the second polarizer is configured to at least partially transmit a linearly polarized light having the sixth polarization.

* * * * *